US008239103B2

(12) United States Patent
Ichihara

(10) Patent No.: US 8,239,103 B2
(45) Date of Patent: Aug. 7, 2012

(54) VEHICLE CONTROL DEVICE AND CONTROL METHOD

(75) Inventor: Masaaki Ichihara, Anpachi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 230 days.

(21) Appl. No.: 12/677,638

(22) PCT Filed: Sep. 26, 2008

(86) PCT No.: PCT/JP2008/067429

§ 371 (c)(1), (2), (4) Date: Mar. 11, 2010

(87) PCT Pub. No.: WO2009/047988

PCT Pub. Date: Apr. 16, 2009

(65) Prior Publication Data

US 2010/0211272 A1 Aug. 19, 2010

(30) Foreign Application Priority Data

Oct. 10, 2007 (JP) ................................ 2007-264446

(51) Int. Cl.
*G05D 1/00* (2006.01)

(52) U.S. Cl. ........................................................ 701/49

(58) Field of Classification Search .................... 701/36, 701/49

See application file for complete search history.

(56) References Cited

U.S. PATENT DOCUMENTS

| | | | |
|---|---|---|---|
| 5,490,572 | A | 2/1996 | Tajiri et al. |
| 2004/0094230 | A1 | 5/2004 | Ono et al. |

FOREIGN PATENT DOCUMENTS

| | | | |
|---|---|---|---|
| JP | A-5-262144 | | 10/1993 |
| JP | A-10-262303 | | 9/1998 |
| JP | A-11-318004 | | 11/1999 |
| JP | A-2002-54331 | | 2/2002 |
| JP | 2003-082900 | * | 3/2003 |
| JP | A-2003-82900 | | 3/2003 |
| JP | 2004-150064 | * | 5/2004 |
| JP | A-2004-150064 | | 5/2004 |
| JP | A-2005-273281 | | 10/2005 |
| JP | 2005-306084 | * | 11/2005 |
| JP | A-2005-306084 | | 11/2005 |

OTHER PUBLICATIONS

International Search Report mailed on Dec. 2, 2008 in corresponding International Application No. PCT/JP2008/067429 (with translation).

Jun. 16, 2009 Written Opinion issued in PCT/JP2008/067429 (with translation).

Dec. 2, 2008 Written Opinion issued in PCT/JP2008/067429 (with translation).

Jan. 14, 2010 International Preliminary Report in Patentability issued in PCT/JP2008/067429 (with translation).

* cited by examiner

*Primary Examiner* — Kim T Nguyen
(74) *Attorney, Agent, or Firm* — Oliff & Berridge, PLC

(57) ABSTRACT

In order to simplify a door lock operation by a user after starting an energy supply receiving operation, an ECU mounted on a vehicle stores an ID code beforehand. Furthermore, ECU locks all the doors, if a charging paddle on the power supply device side is connected with a charging plug on the vehicle side, and if an ID code received from the power supply device matches the ID code stored beforehand, and if a drive system of the vehicle is stopped, and if all the doors of the vehicle are closed.

10 Claims, 13 Drawing Sheets

VEHICLE CONTROL DEVICE AND CONTROL METHOD

TECHNICAL FIRM

The present invention relates to a system for controlling a vehicle, and more particularly to a system configured with a terminal that can be carried by a user of a vehicle, a supply device supplying energy to a vehicle, and a vehicle.

BACKGROUND ART

When energy such as gasoline or electricity is supplied to a conventional gasoline car or electric vehicle, for example, a connector for energy supply is inserted into an energy receptacle provided at a quarter panel portion of the vehicle body so that energy is supplied to the vehicle through the connector. The energy receptacle is covered by a lid, which is opened through the user's manual operation when energy is supplied. Then, at the end of supply, this lid is closed again through the user's manual operation. In this manner, the operation of opening and closing the lid has to be manually done every time energy is supplied, which makes the energy supply operation troublesome. A technique of automatically performing such a lid opening/closing operation for simplifying the energy supply operation is disclosed, for example, in Japanese Patent Laying-Open No. 2005-273281 (Patent Document 1).

An unlocking system disclosed in Japanese Patent Laying-Open No. 2005-273281 is configured with a gasoline station-side device and a vehicle-side device. The vehicle-side device includes a reception portion receiving a signal from the gasoline station side, a refueling cap portion, and a lock/unlock control unit of the refueling cap portion. The gasoline station-side device includes a camera portion detecting a vehicle number of a vehicle coming into the gasoline station and a transmission portion comparing the detected vehicle number with vehicle numbers registered beforehand and, if there is a match, transmitting a vehicle signal to the vehicle side for unlocking the refueling cap.

According to the unlocking system disclosed in Japanese Patent Laying-Open No. 2005-273281, the gasoline-station side device detects a vehicle number, compares the detected vehicle number with data registered beforehand and, if there is a match, transmits a vehicle signal to the vehicle side for unlocking the refueling cap. This can save the vehicle user from performing an unlocking operation and automate unlocking of the refueling cap of the vehicle.

Patent Document 1: Japanese Patent Laying-Open No. 2005-273281

DISCLOSURE OF THE INVENTION

Problems to be Solved by the Invention

The system disclosed in Patent Document 1, however, requires an operation of registering a vehicle number in advance in the gasoline station-side device. In addition, for vehicles not registered in this manner, it is still necessary to open a fuel port through a manual operation. The operation in filling gasoline thus remains to be troublesome.

The present invention is made to solve the aforementioned problem, and an object of the present invention is to provide a vehicle control system, a supply device, and a vehicle for allowing an energy receptacle of a vehicle to be opened/ closed appropriately according to the user's intention of receiving energy supply, with a simplified energy supply receiving operation.

Another object of the present invention is to provide a vehicle control device and a control method for achieving a simplified door lock operation by the user after starting of energy supply receiving operation.

Means For Solving The Problems

A control device in accordance with the present invention controls a vehicle including an energy receptacle for receiving energy supply from a supply device and at least one door opened and closed by a user. The supply device is provided with a connector connected to the energy receptacle at a time of energy supply to the vehicle. The control device includes a door lock device for locking the door and a control unit connected to the door lock device. The control unit controls the door lock device such that the door is locked when a prescribed condition is satisfied. The prescribed condition includes a condition that the connector is connected with the energy receptacle.

Preferably, the prescribed condition further includes at least any one of a condition that the door is in a closed state, a condition that a state in which the door is closed is maintained for a prescribed time, and a condition that a drive system for driving the vehicle is stopped.

Further preferably, the supply device receives unique information of the vehicle as transmitted from a terminal that is portable by the user and transmits the unique information to the control device. The control device further includes a receiver connected to the control unit to receive the unique information transmitted from the supply device. The prescribed condition further includes a matching condition that the unique information received by the receiver matches unique information stored beforehand in the control unit.

Further preferably, the control device further includes an opening/closing device connected to the control unit for opening and closing a cap portion covering the energy receptacle. The control unit controls the opening/closing device when the matching condition is satisfied.

Further preferably, the control device further includes a connector lock device connected to the control unit for locking connection between the connector and the energy receptacle. The control unit controls the connector lock device when the matching condition is satisfied.

Further preferably, the supply device transmits a request signal to a predetermined range. The terminal transmits the unique information to the supply device when receiving the request signal from the supply device. The predetermined range is set in a range that includes the energy receptacle and does not include a seat of the vehicle, in a state in which the vehicle is present at a location where energy supply from the supply device to the vehicle is available.

Further preferably, the vehicle receives unique information of the vehicle as transmitted from a terminal that is portable by the user, by a receiver provided in a vicinity of the energy receptacle. The prescribed condition further includes a matching condition that the unique information received by the receiver provided in a vicinity of the energy receptacle matches unique information stored beforehand in the control unit.

Further preferably, the connector is provided with an input portion for the user to input a lock request indicating that locking of the door is requested. The prescribed condition further includes a condition that the lock request is input.

A control method in accordance with another aspect of the present invention is performed by a control unit controlling a vehicle including an energy receptacle receiving energy supply from a supply device and at least one door opened and closed by a user. The supply device is provided with a connector connected to the energy receptacle at a time of energy supply to the vehicle. The control unit is connected with a door lock device for locking the door. The control method includes the steps of: determining whether or not the connector is connected with the energy receptacle; and controlling the door lock device such that the door is locked when the connector is connected with the energy receptacle.

A vehicle control system in accordance with another aspect of the present invention is configured with a terminal that is portable by a user of a vehicle, a supply device supplying energy to a vehicle, and a vehicle. The terminal includes a terminal-side storage portion storing unique information of the vehicle, a request signal receiving portion receiving a request signal from the supply device, and a unique information transmitting portion transmitting the unique information to the supply device, in response to reception of the request signal. The supply device includes a connector connected, at a time of energy supply, to an energy receptacle provided at the vehicle, a detection portion detecting a state of the connector, a request signal transmitting portion transmitting a request signal to a predetermined range, a unique information receiving portion receiving the unique information transmitted from the terminal, and a first instruction signal transmitting portion transmitting to the vehicle an instruction signal including unique information and an open/close instruction, based on the detected state of the connector, in response to reception of the unique information. The vehicle includes an energy receptacle, a cap portion covering the energy receptacle, an open/close switching portion switching the cap portion to one of an open state and a closed state, a vehicle-side storage portion storing unique information, an instruction signal receiving portion receiving the instruction signal transmitted from the supply device, and an open/close control portion controlling the open/close switching portion based on the open/close instruction included in the instruction signal, when the unique information included in the instruction signal matches the unique information stored in the vehicle-side storage portion.

According to this invention, the supply device transmits a request signal to a predetermined range. Upon reception of the request signal from the supply device, the terminal transmits the stored unique information of the vehicle to the supply device. Upon reception of the unique information from the terminal, the supply device transmits to the vehicle an instruction signal including unique information and an open/close instruction, based on a state of the connector connected, at a time of energy supply, to the energy receptacle provided at the vehicle. In this manner, for example, when the user removes the connector from the supply device at the start of energy supply, an instruction signal including unique information and an open instruction can be transmitted to the vehicle, assuming that the user has an intention of receiving energy supply, or when the user returns the connector to the supply device at the end of energy supply, an instruction signal including unique information and a close instruction can be transmitted to the vehicle, assuming that the user does not have an intention of receiving energy supply. When the unique information included in the received instruction signal matches the stored unique information, the vehicle allows the cap portion covering the energy receptacle to be opened/closed based on the open/close instruction included in the instruction signal. Therefore, even if the user does not register unique information beforehand in the supply device, or even if the user does not perform an operation of opening/closing the energy receptacle, the energy receptacle can be opened/closed appropriately according to the user's intention of receiving energy supply. As a result, it is possible to provide a vehicle control system allowing the energy receptacle of the vehicle to be opened/closed appropriately according to the user's intention of receiving energy supply, with a simplified energy supply receiving operation.

A vehicle control system in accordance with another aspect of the present invention is configured with a terminal that is portable by a user of a vehicle, a supply device supplying energy to a vehicle, and a vehicle. The terminal includes a terminal-side storage portion storing unique information of the vehicle, a request signal receiving portion receiving a request signal from the supply device, and a unique information transmitting portion transmitting the unique information to the supply device, in response to reception of the request signal. The supply device includes a request signal transmitting portion transmitting a request signal to a predetermined range, a unique information receiving portion receiving the unique information transmitted from the terminal, and a first instruction signal transmitting portion transmitting to the vehicle an instruction signal including unique information and an open/close instruction in response to reception of the unique information. The vehicle includes an energy receptacle, a cap portion covering the energy receptacle, an open/close switching portion switching the cap portion to one of an open state and a closed state, a vehicle-side storage portion storing unique information, an instruction signal receiving portion receiving the instruction signal transmitted from the supply device, and an open/close control portion controlling the open/close switching portion based on the open/close instruction included in the instruction signal, when the unique information included in the instruction signal matches the unique information stored in the vehicle-side storage portion. The predetermined range is a range that includes the energy receptacle and does not include a seat of the vehicle, in a state in which the vehicle is stopped at a location where energy supply is available.

According to this invention, the supply device transmits a request signal to a predetermined range. Upon reception of the request signal from the supply device, the terminal transmits the stored unique information of the vehicle to the supply device. Upon reception of the unique information from the terminal, the supply device transmits an instruction signal including unique information and an open/close instruction to the vehicle. When the unique information included in the received instruction signal matches the stored unique information, the vehicle allows the cap portion covering the energy receptacle to be opened/closed, based on the open/close instruction included in the instruction signal. Here, a predetermined range (a transmission range of the request signal from the supply device) is a range that includes the energy receptacle and does not include the seat of the vehicle, in a state in which the vehicle is stopped at a location where energy supply is available. In this manner, even when the vehicle is stopped in proximity to the supply device, an instruction signal is not transmitted to the vehicle at the instant when the user carrying the terminal is in the car. At the instant when the user thereafter gets out of the vehicle and approaches the vicinity of the energy receptacle for the purpose of receiving energy supply (that is, when entering the transmission range of the request signal), an instruction signal is transmitted to the vehicle. Therefore, even if the user does not register the unique information beforehand in the supply device, or even if the user does not perform an operation of opening/closing the energy receptacle, the energy receptacle can be opened/closed automatically when the user intends to receive energy supply. Furthermore, since the vehicle receives an instruction signal from the supply device, in a case where the user does not have an intention of receiving energy supply and the supply device is not in the proximity of the vehicle, the instruction signal is not transmitted to the vehicle even when the user approaches the vicinity of the energy receptacle. Therefore, as compared with a case where an instruction signal is directly received from the terminal, the energy receptacle can be opened/closed more appropriately according to the user's intention of receiving energy supply. As a result, it is possible to provide a vehicle control system allowing the energy receptacle of the vehicle to be opened/closed appropriately according to the user's intention of receiving energy supply, with a simplified energy supply receiving operation.

Further preferably, a connector is operated to be separated from a predetermined initial position at the start of energy supply. The first instruction signal transmitting portion transmits an instruction signal including unique information and an open instruction, when a state of the connector changes from a state in which it is arranged at the initial position to a state in which it is separated from the initial position. The open/close control portion switches the cap portion to an open state, when the instruction signal includes an open instruction.

According to this invention, when the user operates the connector at the start of energy supply so that a state of the connector changes from a state in which it is arranged at the initial position to a state in which it is separated from the initial position, an instruction signal including unique information and an open instruction is transmitted from the supply device to the vehicle. When the instruction signal includes an open instruction, the cap portion covering the energy receptacle of the vehicle is opened. Accordingly, it is appropriately determined based on a state of the connector that the user has an intention of receiving energy supply, so that the energy receptacle can be opened automatically.

Further preferably, the connector is operated to be returned to the predetermined initial position at the end of energy supply. When a state of the connector changes from a state in which it is separated from the initial position to a state in which it is arranged at the initial position, the first instruction signal transmitting portion transmits an instruction signal including unique information and a close instruction. The open/close control portion switches the cap portion to a closed state when the instruction signal includes a close instruction.

According to this invention, when the user operates the connector at the end of energy supply so that a state of the connector changes from a state in which it is separated from the initial position to a state in which it is arranged at the initial position, an instruction signal including unique information and a close instruction is transmitted from the supply device to the vehicle. When the instruction signal includes a close instruction, the cap portion covering the energy receptacle is closed. Accordingly, it is appropriately determined based on a state of the connector that the user has an intention of terminating reception of energy supply, so that the energy receptacle can be closed automatically. In addition, since the connector is completely removed from the energy receptacle when the cap portion is closed, it is unlikely that the cap portion and the connector interfere with each other, thereby ensuring that the cap portion is closed.

Further preferably, the supply device further includes a second instruction signal transmitting portion transmitting to the vehicle one of an instruction signal including unique information and an unlock instruction and an instruction signal including only unique information, if the connector is in a state in which it is separated from the initial position, when the unique information is received. The vehicle further includes a lock switching portion switching a state of the connector and the vehicle to one of a lock state and an unlock state, and a lock control portion controlling the lock switching portion to switch the state to the unlock state, when the unique information included in the instruction signal matches the unique information stored in the vehicle-side storage portion, and when the instruction signal includes the unlock instruction or when the instruction includes only unique information.

According to this invention, the supply device transmits to the vehicle one of an instruction signal including unique information and an unlock instruction and an instruction signal including only unique information, when the connector is in a state in which it is separated from the initial position. The vehicle unlocks the connector and the vehicle from each other when the unique information included in the instruction signal matches the stored unique information, and when the instruction signal includes an unlock instruction or when the instruction includes only unique information. In this manner, even when the user leaves the vehicle with the connector locked to the vehicle during reception of energy supply, the connector and the vehicle can automatically be unlocked from each other at the instant when the user returns to the supply device. Therefore, the energy supply termination operation can be simplified.

A supply device in accordance with another aspect of the present invention supplies energy to a vehicle. The supply device includes a connector connected, at a time of energy supply, to an energy receptacle provided at the vehicle, a detection portion detecting a state of the connector, and a communication portion communicating between the vehicle and a terminal that is portable by a user of the vehicle. The communication portion includes a request signal transmitting portion transmitting a request signal to a predetermined range, a reception portion receiving unique information of the vehicle as transmitted from the terminal in response to reception of the request signal by the terminal, and an instruction signal transmitting portion transmitting to the vehicle an instruction signal including unique information and an open/close instruction to open/close a cap portion covering the energy receptacle, based on a detected state of the connector, in response to reception of the unique information.

According to this invention, the supply device communicates between the vehicle and the terminal that is portable by the user of the vehicle. The supply device transmits a request signal to a predetermined range and receives unique information of the vehicle as transmitted from the terminal in response to reception of the request signal by the terminal. Upon reception of the unique information from the terminal, the supply device transmits to the vehicle an instruction signal including unique information and an open/close instruction to open/close the cap portion covering the energy receptacle provided at the vehicle, based on a state of the connector connected, at a time of energy supply, to the energy receptacle provided at the vehicle. In this manner, for example, when the user removes the connector from the supply device at the start of energy supply, an instruction signal including an open instruction and unique information can be transmitted to the vehicle, assuming that the user has an intention of receiving energy supply, or when the user returns the connector to the supply device at the end of energy supply, an instruction including a close instruction and unique information can be transmitted to the vehicle, assuming that the user does not have an intention of receiving energy supply. Therefore, even if the user does not register unique information beforehand in the supply device, or even if the user does not perform an operation of opening/closing the energy receptacle, an instruction signal is automatically transmitted to allow the energy receptacle of the vehicle to be automatically opened/closed, when the user intends to receive energy supply. As a result, the energy receptacle of the vehicle can be opened/closed appropriately according to the user's intention of receiving energy supply, with a simplified energy supply receiving operation.

A supply device in accordance with another aspect of the present invention supplies energy to a vehicle. The supply device includes a communication portion communicating between the vehicle and a terminal that is portable by a user of the vehicle. The communication portion includes a request signal transmitting portion transmitting a request signal to a predetermined range, a reception portion receiving unique information of the vehicle as transmitted from the terminal in response to reception of the request signal by the terminal, and an instruction signal transmitting portion transmitting to the vehicle an instruction signal including unique information and an open/close instruction to open/close a cap portion covering an energy receptacle provided at the vehicle, in response to reception of the unique information. The predetermined range is a range that includes the energy receptacle and does not include a seat of the vehicle, in a state in which the vehicle is stopped at a location where energy supply is available.

According to this invention, the supply device communicates between the vehicle and the terminal that is portable by the user of the vehicle. The supply device transmits a request signal to a predetermined range and receives unique information of the vehicle as transmitted from the terminal in response to reception of the request signal by the terminal. Upon reception of the unique information from the terminal, the supply device transmits to the vehicle an instruction signal including unique information and an open/close instruction to open/close the cap portion covering the energy receptacle provided at the vehicle. Here, a predetermined range (a transmission range of the request signal from the supply device) is a range that includes the energy receptacle and does not include the seat of the vehicle, in a state in which the vehicle is stopped at a location where energy supply is available. In this manner, even when the vehicle is stopped in proximity to the supply device, the instruction signal is not transmitted to the vehicle at the instant when the user carrying the terminal is in the car. At the instant when the user thereafter gets out of the vehicle and approaches the vicinity of the energy receptacle for the purpose of receiving energy supply (that is, when entering the transmission range of the request signal), the instruction signal is transmitted to the vehicle. Therefore, even if the user does not register unique information beforehand in the supply device, or even if the user does not perform an operation of opening/closing the energy receptacle, the instruction signal is automatically transmitted to allow the energy receptacle of the vehicle to be automatically opened/closed, when the user intends to receive energy supply. Furthermore, the instruction signal is transmitted to the vehicle in response to reception of the unique information from the terminal. In other words, when the user does not have an intention of receiving energy supply and the supply device is not present in the proximity of the vehicle, the instruction signal is not transmitted to the vehicle even when the user approaches the vicinity of the energy receptacle. Therefore, the instruction signal can be transmitted more appropriately according to the user's intention of receiving energy supply, as compared with a case where the instruction signal is directly transmitted to the vehicle from the terminal. As a result, it is possible to provide a supply device allowing the energy receptacle of the vehicle to be opened/closed appropriately according to the user's intention of receiving energy supply, with a simplified energy supply receiving operation.

Further preferably, a connector is operated to be separated from a predetermined initial position at the start of energy supply. The instruction signal transmitting portion transmits an instruction signal including an open instruction to open the cap portion and unique information, when a state of the connector changes from a state in which it is arranged at the initial position to a state in which it is separated from the initial position.

According to this invention, when the user operates the connector at the start of energy supply so that a state of the connector changes from a state in which it is arranged at the initial position to a state in which it is separated from the initial position, an instruction signal including an open instruction and unique information is transmitted from the supply device to the vehicle. Accordingly, it is appropriately determined based on a state of the connector that the user has an intention of receiving energy supply, so that the energy receptacle can be opened automatically.

Further preferably, the connector is operated to be returned to a predetermined initial position at the end of energy supply. When a state of the connector changes from a state in which it is separated from the initial position to a state in which it is arranged at the initial position, the instruction signal transmitting portion transmits an instruction signal including unique information and a close instruction to close the cap portion.

According to this invention, when the user operates the connector at the end of energy supply so that a state of the connector changes from a state in which it is separated from the initial position to a state in which it is arranged at the initial position, an instruction signal including unique information and a close instruction is transmitted from the supply device to the vehicle. Accordingly, it is appropriately determined based on a state of the connector that the user has an intention of terminating reception of energy supply, so that the energy receptacle can be closed automatically. In addition, since the connector is completely removed from the energy receptacle when the close instruction is transmitted, it is unlikely that the cap portion and the connector interfere with each other, thereby ensuring that the cap portion is closed.

Further preferably, if the connector is in a state in which it is separated from the initial position when unique information is received, the supply device transmits one of an instruction signal including an unlock instruction to unlock the connector and the vehicle from each other and unique information and an instruction signal only including unique information.

According to this invention, if the connector is in a state in which it is separated from the initial position when unique information is received, the supply device transmits one of an instruction signal including an unlock instruction to unlock the connector and the vehicle from each other and unique information and an instruction signal only including unique information. In this manner, even if the user locks the connector with the vehicle and leaves the vehicle during reception of energy supply, an instruction signal including an unlock instruction or an instruction signal including only unique information can be transmitted at the instant when the user returns to the supply device. Therefore, for example, the connector and the vehicle are unlocked from each other when an unlock instruction or only unique information is received at the vehicle side, thereby simplifying the energy supply termination operation.

A vehicle in accordance with another aspect of the present invention is supplied with energy from a supply device. This vehicle includes: an energy receptacle receiving energy supply from the supply device; a cap portion covering the energy receptacle; an open/close switching portion switching the cap portion to one of an open state and a closed state; a storage portion storing unique information of the vehicle; a reception portion receiving an instruction signal, including unique information and an open instruction to open the cap portion, which is transmitted from the supply device when a connector operated to be separated from a predetermined initial position and then connected to the energy receptacle at the start of energy supply changes from a state in which it is arranged at the initial position to a state in which it is separated, or receiving an instruction signal, including unique information and a close instruction to close the cap portion, which is transmitted from the supply device when the connector changes from a state in which it is separated to a state in which it is arranged at the initial position; and an open/close control portion switching the cap portion to an open state when the unique information included in the instruction signal matches the unique information stored in the storage portion and when the instruction signal includes an open instruction, or switching the cap portion to a closed state when the unique information included in the instruction signal matches the unique information stored in the storage portion and when the instruction signal includes a close instruction.

According to this invention, the vehicle receives an instruction signal, including unique information and an open instruction to open the cap portion, which is transmitted from the supply device when the connector operated to be separated from a predetermined initial position to be connected with the energy receptacle at the start of energy supply changes from a state in which it is arranged at the initial position to a state in which it is separated. When the unique information included in the instruction signal matches the unique information stored in the storage portion and when the instruction signal includes an open instruction, the vehicle switches the cap portion to an open state. In this manner, for example, when the user removes the connector from the supply device at the start of energy supply, the energy receptacle can be opened assuming that the user has an intention of receiving energy supply. On the other hand, the vehicle receives an instruction signal, including unique information and a close instruction to close the cap portion, which is transmitted from the supply device when the connector changes from a state in which it is separated to a state in which it is arranged at the initial position. When the unique information included in the instruction signal matches the unique information stored in the storage portion and when the instruction signal includes a close instruction, the vehicle switches the cap portion to a closed state. In this manner, when the user returns the connector to the supply device at the end of energy supply, the energy receptacle can be closed assuming that the user does not have an intention of receiving energy supply. Therefore, even if the user does not register unique information beforehand in the supply device, or even if the user does not perform an operation of opening/closing the energy receptacle, the energy receptacle can be opened/closed appropriately according to the user's intention of receiving energy supply. As a result, it is possible to provide a vehicle allowing the energy receptacle of the vehicle to be opened/closed appropriately according to the user's intention of receiving energy supply, with a simplified energy supply receiving operation.

A vehicle in accordance with another aspect of the present invention is supplied with energy from a supply device. This vehicle includes: an energy receptacle receiving energy supply from the supply device; a cap portion covering the energy receptacle; an open/close switching portion switching the cap portion to one of an open state and a closed state; a storage portion storing unique information of the vehicle; a reception portion receiving an instruction signal, including unique information received by the supply device from a terminal and an open/close instruction to open/close the cap portion, which is transmitted from the supply device when the vehicle is located in a predetermined range and when the supply device receives unique information from the terminal that is portable by a user of the vehicle; and a switching control portion controlling the open/close switching portion based on the open/close instruction included in the instruction signal, when the unique information included in the instruction signal matches the unique information stored in the storage portion. The predetermined range is a range in which energy supply from the supply device can be received and a range that includes the energy receptacle and does not include a seat of the vehicle in a communication range between the supply device and the terminal.

According to this invention, the vehicle receives an instruction signal from the supply device when the vehicle is located in a predetermined range and when the supply device receives unique information from a terminal that is portable by the user of the vehicle. The instruction signal includes an open/close instruction to open/close the cap portion and unique information received by the supply device from the terminal. When the unique information included in the instruction signal matches the unique information stored in the storage portion, the vehicle controls the open/close switching portion based on the open/close instruction included in the instruction signal. Here, the predetermined range is a range in which energy supply from the supply device can be received and a range that includes the energy receptacle and does not includes the seat of the vehicle in a communication range between the supply device and the terminal. In this manner even when the vehicle is stopped in proximity to the supply device, at the instant when the user carrying the terminal is in the car (that is, at the instant when the user is not in the communication range between the supply device and the terminal), the instruction signal is not received by the vehicle. At the instant when the user thereafter gets out of the vehicle and approaches the vicinity of the energy receptacle for the purpose of receiving energy supply (that is, at the instant when the user enters the communication range between the supply device and the terminal), the instruction signal is received by the user. Therefore, even if the user doe not register unique information beforehand in the supply device, or even if the user does not operate an operation of opening/closing the energy receptacle, the energy receptacle can automatically be opened/closed when the user intends to receive energy supply. Furthermore, since the vehicle receives the instruction signal from the supply device, in a case where the user does not have an intention of receiving energy supply and the supply device is not present in proximity to the vehicle, the instruction signal is not transmitted to the vehicle even when the user approaches the vicinity of the energy receptacle. Therefore, as compared with a case where the instruction signal is directly received from the terminal, the energy receptacle can be opened/closed more appropriately according to the user's intention of receiving energy supply. As a result, it is possible to provide a vehicle allowing the energy receptacle of the vehicle to be opened/closed appropriately according to the user's intention of receiving energy supply, with a simplified energy supply receiving operation.

Preferably, the vehicle further includes: a lock switching portion switching a state between the connector and the vehicle to one of a lock state and an unlock state; a reception portion receiving from the supply device one of an instruction signal including unique information and an unlock instruction and an instruction signal including only unique information, when the connector is in a separated state; and a lock control portion controlling the lock switching portion to switch the state to the unlock state, when the unique information included in the instruction signal matches the unique information stored in the storage portion and when the instruction signal includes an unlock instruction or when the instruction includes only unique information.

According to this invention, the vehicle receives from the supply device one of an instruction signal including unique information and an unlock instruction and an instruction signal including only unique information, when the connector is in a separated state. When the unique information included in the instruction signal matches the stored unique information, and when the instruction signal includes an unlock instruction or when the instruction signal includes only unique information, the vehicle unlocks the connector and the vehicle from each other. In this manner, even when the user locks the connector with the vehicle and leaves the vehicle during reception of energy supply, the connector and the vehicle are automatically unlocked from each other at the instant when the user returns to the supply device. Therefore, the energy supply termination operation can be simplified.

DESCRIPTION OF THE REFERENCE SIGNS

Figure 1:
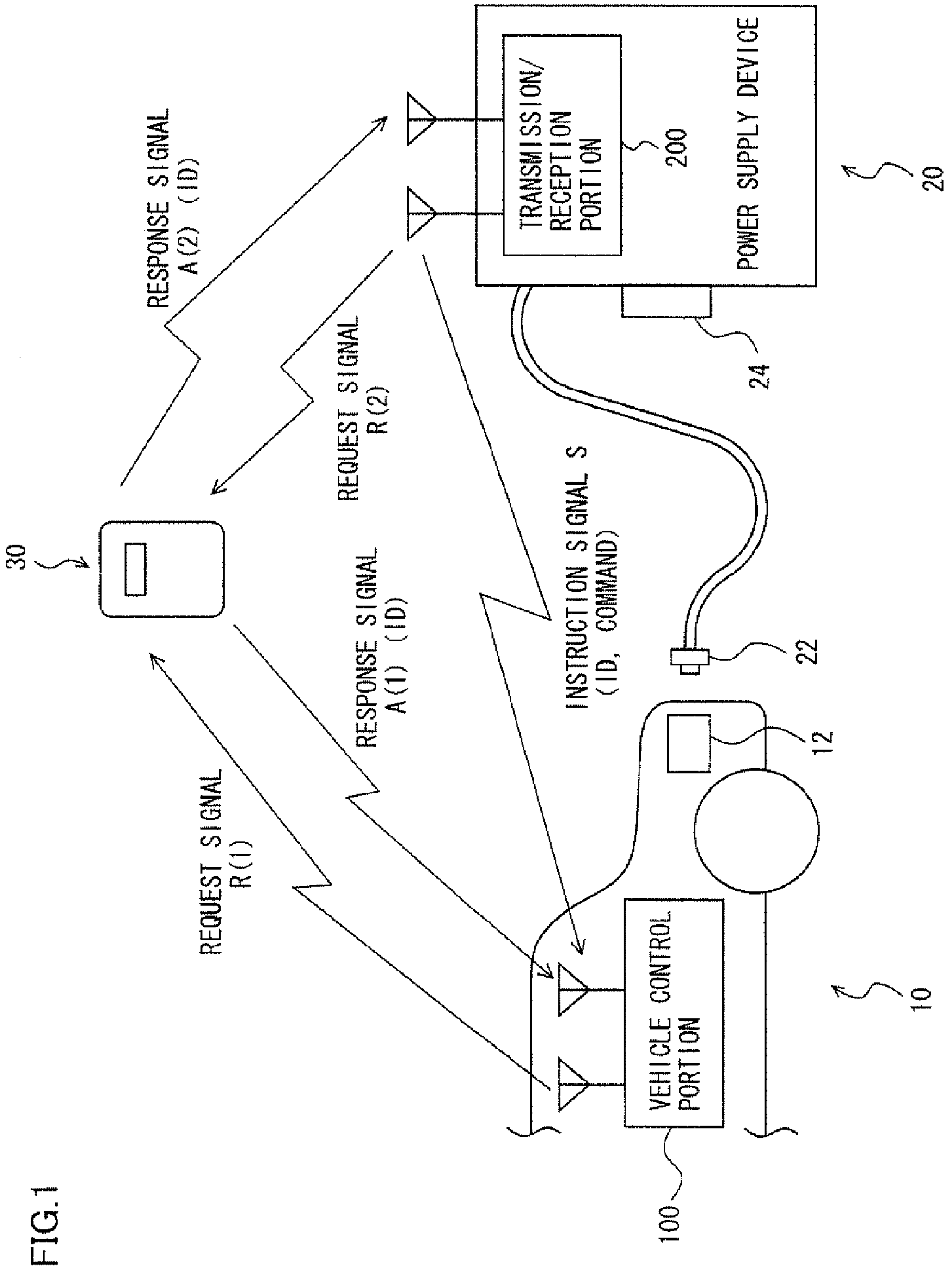
FIG. 1 is a diagram showing a configuration of a vehicle control system in accordance with a first embodiment of the present invention.

10, 1010 vehicle, 12 receptacle, 20 power supply device, 22 charging paddle, 24 paddle attachment portion, 30 terminal, 100, 1100 vehicle control portion, 110 lid, 120 exterior transmitter, 122A, 122B, 122C outside door handle, 124 interior receiver, 126C luggage room transmitter, 126A, 126B interior transmitter, 130 lid opening/closing device, 140 charging plug, 142 connection sensor, 150 paddle lock device, 160, 250, 1160 ECU, 162, 252 ID storage portion, 164 ID verification portion, 166 command instruction portion, 200 transmission/reception portion, 210 receiver, 220 transmitter, 230 charging control device, 240 paddle position sensor, 254 signal transmission instruction portion, 1170 drive system operation sensor, 1172 door opening/closing sensor, 1174 door lock device.

BEST MODES FOR CARRYING OUT THE INVENTION

In the following, embodiments of the present invention will be described with reference to the figures. In the following description, the same components are denoted with the same reference characters. They have the same designations and functions. Therefore, a detailed description thereof will not be repeated.

First Embodiment

Referring to FIG. 1, a vehicle control system in accordance with the present embodiment will be described. The vehicle control system is configured with a vehicle 10 having a motor driven by electric power as a driving source, a power supply device 20 supplying electric power to vehicle 10, and a terminal 30 carried by a user of vehicle 10, wherein based on a verification result of vehicle unique information (hereinafter also referred as ID code) wirelessly received/transmitted therebetween, control of vehicle 10 can be performed without the user of vehicle 10 (hereinafter also simply referred to as user) picking up a key or an operation unit. It is noted that vehicle 10 and power supply device 20 included in the vehicle control system in accordance with the present embodiment are also a manner of the present invention.

An ID code is stored beforehand in terminal 30. Terminal 30 transmits a response signal A(1) including the ID code to vehicle 10, in response to a request signal R(1) from vehicle 10. Terminal 30 also transmits a response signal A(2) including the ID code to power supply device 20, in response to a request signal R(2) from power supply device 20.

Power supply device 20 is installed in proximity to a parking lot of vehicle 10. Power supply device 20 may be installed, for example, at a power station provided in a public space. Power supply device 20 includes a charging paddle 22, a paddle attachment portion 24, and a transmission/reception portion 200.

Charging paddle 22 is usually (when not charging) attached to paddle attachment portion 24. Charging paddle 22 is removed from paddle attachment portion 24 by the user at the start of charging operation and is then inserted into a receptacle 12 of vehicle 10. Electric power is supplied from power supply device 20 to vehicle 10 through charging paddle 22. At the end of charging operation, charging paddle 22 is attached again to paddle attachment portion 24 by the user.

Transmission/reception portion 200 performs wireless communication with vehicle 10 and terminal 30. Transmission/reception portion 200 transmits request signal R(2) to terminal 30. Transmission/reception portion 200 receives response signal A(2) from terminal 30 to transmit to vehicle 10 an instruction signal S including an ID code included in response signal A(2) and a command to request control of vehicle 10.

Vehicle 10 includes receptacle 12 and a vehicle control portion 100. Vehicle 10 receives supply of electric power to be used to drive the motor from power supply device 20 through charging paddle 22 inserted in receptacle 12 during charging and stores the received electric power into a battery (not shown).

Vehicle control portion 100 performs wireless communication with terminal 30 and power supply device 20. Vehicle control portion 100 sends request signal R(1) to terminal 30. Vehicle control portion 100 receives response signal A(1) from terminal 30 and instruction signal S from power supply device 20. Vehicle control portion 100 controls each portion of vehicle 10 based on instruction signal S received from power supply device 20.

Figure 2:
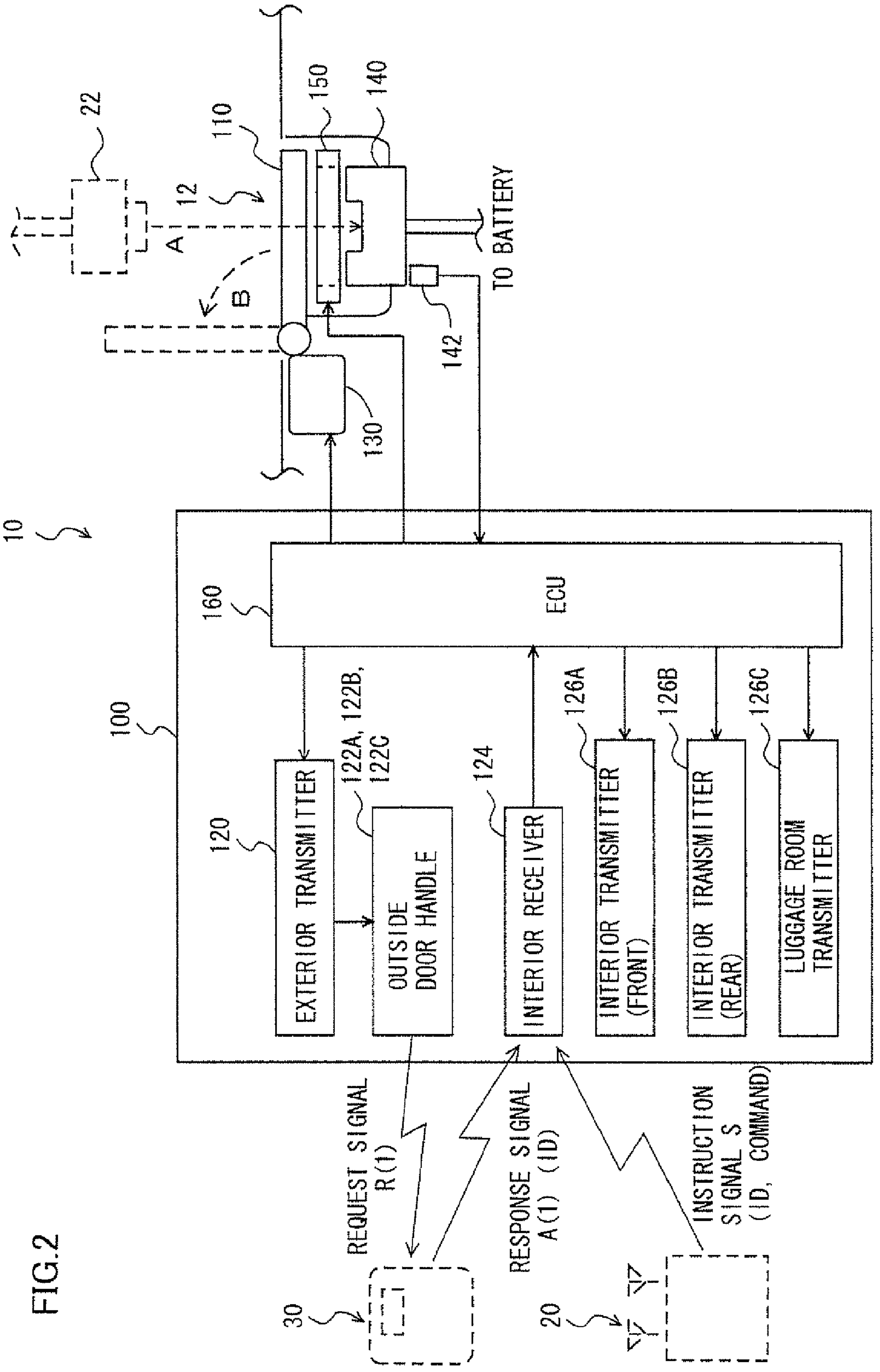
FIG. 2 is a diagram showing a structure of a vehicle in accordance with the first embodiment of the present invention.

Referring to FIG. 2, vehicle 10 and vehicle control portion 100 will be further described. Vehicle control portion 100 includes an exterior transmitter 120, outside door handles 122A, 122B, 122C, an interior receiver 124, interior transmitters 126A, 126B, a luggage room transmitter 126C, and an ECU 160.

Exterior transmitter 120 transmits request signal R(1) to the outside of vehicle 10 from an antenna contained in each of outside door handles 122A, 122B, 122C according to an instruction from ECU 160. Outside door handles 122A, 122B, 122C are provided at a right front door, a left front door, and a back door, respectively, to transmit request signal R(1) to each predetermined transmission area. Request signal R(1) is always transmitted during system operation, and when terminal 30 exists in each transmission area, response signal A(1) is transmitted from terminal 30 to interior receiver 124.

Interior receiver 124 is provided at the back of the roof of vehicle 10 to receive response signal A(1) and instruction signal S and output the received information to ECU 160.

Interior transmitter 126A, interior transmitter 126B, and luggage room transmitter 126C transmit request signal R(1) to a front-side area in the vehicle interior, a rear-side area in the vehicle interior, and a luggage room area in the vehicle interior, respectively. Response signal A(1) from terminal 30 includes information indicating request signal R(1) of which transmission area is responded to. Because of this information, it can be grasped at vehicle 10 in which transmission area terminal 30 exists.

Vehicle 10 further includes a lid 110, a lid opening/closing device 130, a charging plug 140, a paddle lock device 150, and a connection sensor 142.

Lid 110 is a cap covering receptacle 12 and is fixed to vehicle 10 in such a manner that it can be opened and closed. Lid opening/closing device 130 controls open/closed states of lid 110 according to an instruction from ECU 160. Lid 110 is opened from a closed state, at the start of charging (see arrow B).

Charging plug 140 is provided in the inside of receptacle 12 and is connected to a battery through a harness. At a time of charging, lid 110 is opened and charging paddle 22 is thereafter inserted (see arrow A) so that charging plug 140 is electrically connected with charging paddle 22.

Connection sensor 142 detects whether charging plug 140 and charging paddle 22 are connected with each other or not and outputs a signal indicating a detection result to ECU 160.

Paddle lock device 150 is a device that locks charging paddle 22 while charging paddle 22 is inserted in receptacle 12, according to an instruction from ECU 160.

ECU 160 controls components including lid opening/closing device 130 and paddle lock device 150, based on a signal sent from interior receiver 124, connection sensor 142, and the like, and a map and a program stored in a ROM (Read Only Memory).

Figure 3:
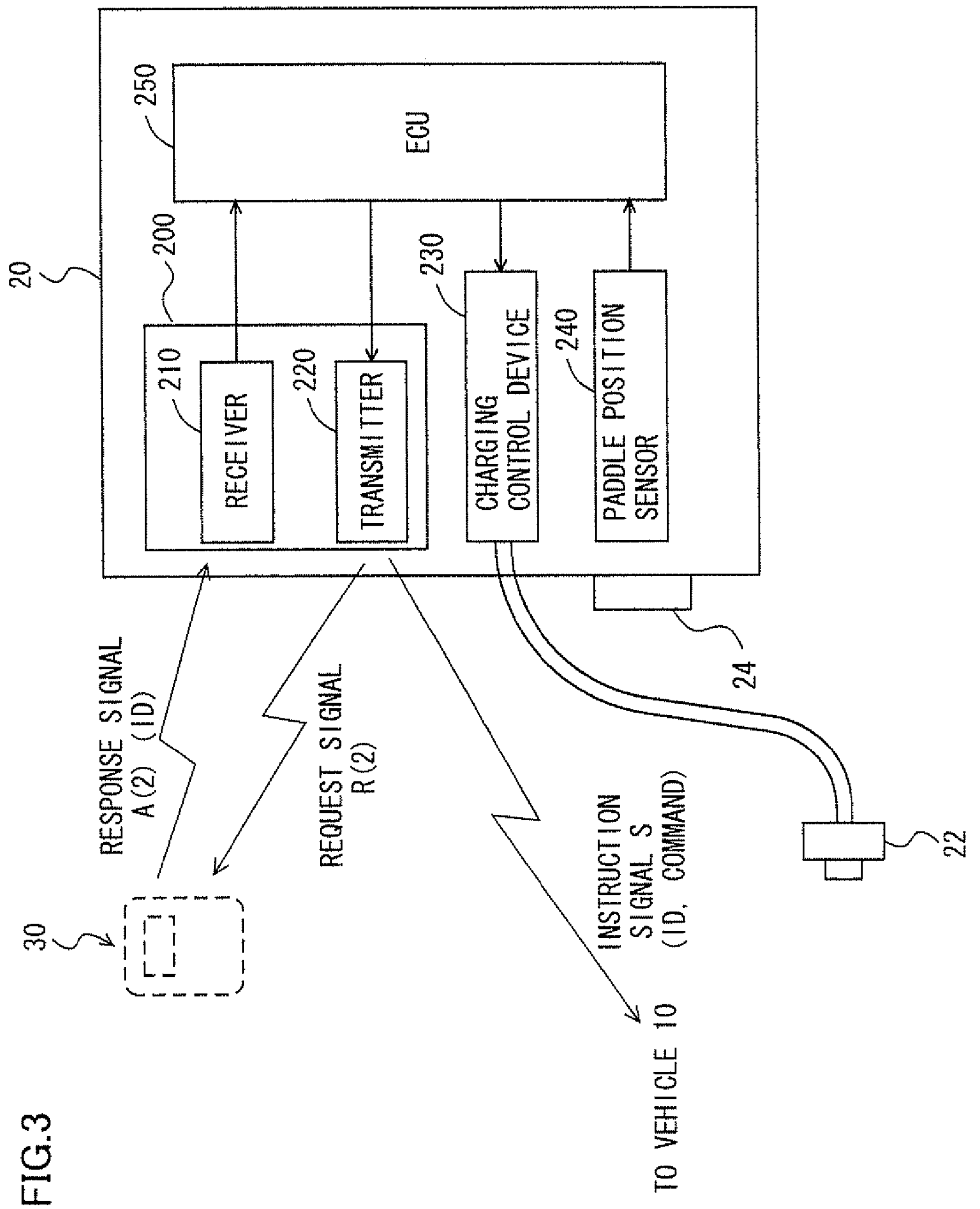
FIG. 3 is a diagram showing a structure of a power supply device in accordance with the first embodiment of the present invention.

Referring to FIG. 3, power supply device 20 will be further described. Transmission/reception portion 200 is comprised of a receiver 210 and a transmitter 220. Power supply device 20 further includes a charging control device 230, a paddle position sensor 240, and an ECU 250.

Receiver 210 receives response signal A(2) including an ID code from terminal 30 to output the same to ECU 250.

Transmitter 220 transmits request signal R(2) to a predetermined transmission area, according to an instruction from ECU 250. When terminal 30 exists in this transmission area, response signal A(2) is transmitted from terminal 30. Transmitter 220 also transmits to vehicle 10 instruction signal S including an ID code included in response signal A(2) and a command to request control of vehicle 10, according to an instruction from ECU 250.

Charging control device 230 controls an electric-power value, a current value, a voltage value, and the like to be supplied to vehicle 10 through charging paddle 22, according to an instruction from ECU 250.

Paddle position sensor 240 detects whether charging paddle 22 is attached to paddle attachment portion 24 or not and outputs a signal indicating a detection result to ECU 250.

ECU 250 controls components including transmitter 220 and charging control device 230, based on a signal sent from receiver 210, paddle position sensor 240, and the like and a map and a program stored in a ROM (Read Only Memory).

Figure 4:
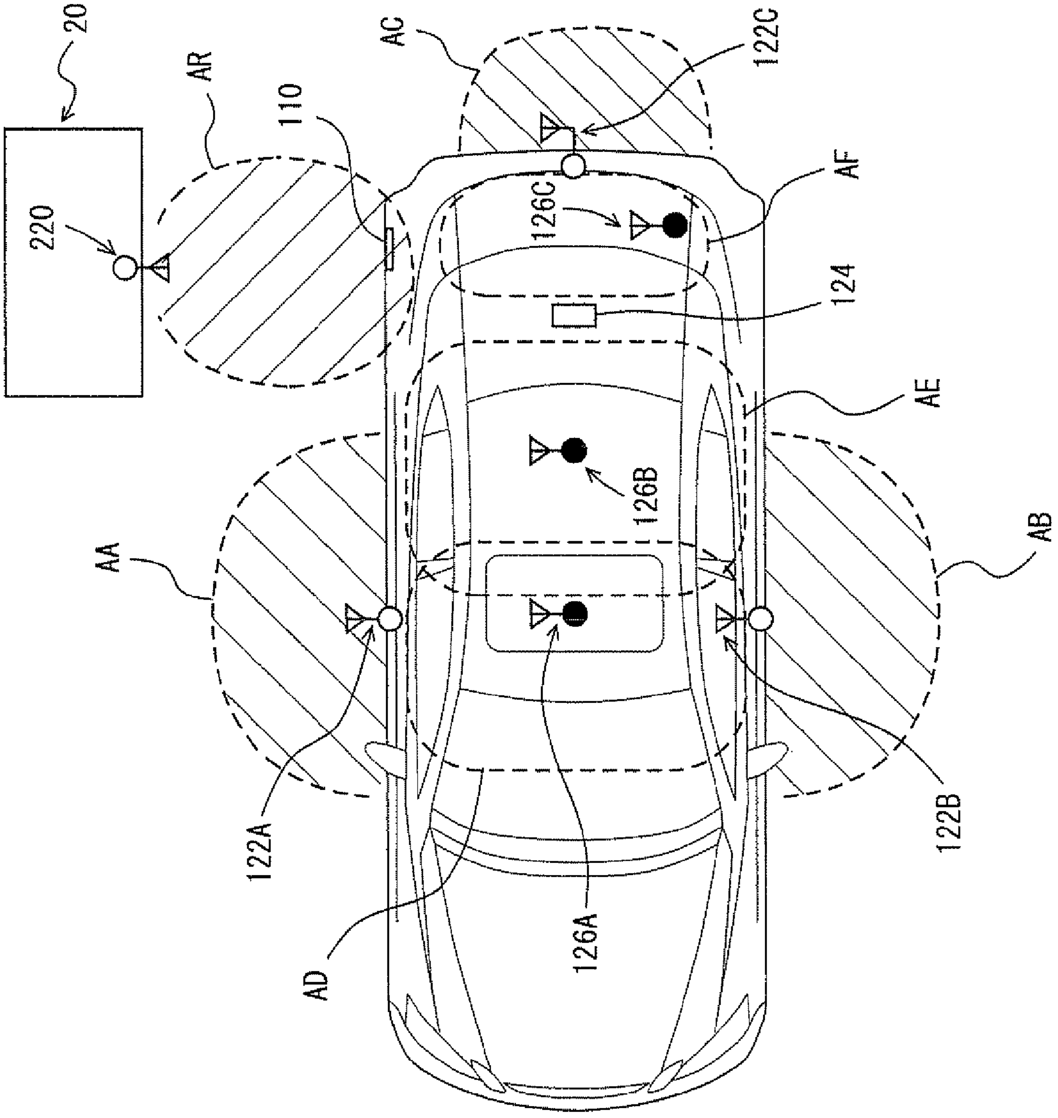
FIG. 4 is a diagram showing communicable areas between the vehicle and the power supply device and a terminal in accordance with the first embodiment of the present invention.

Referring to FIG. 4, a communicable area between vehicle 10 and power supply device 20 and terminal 30 will be described. FIG. 4 shows a state in which vehicle 10 having lid 110 provided on the right quarter panel portion is parked at a charging available location in proximity to power supply device 20.

Areas AA, AB, AC show the transmission areas of request signal R(1) from outside door handles 122A, 122B, 122C, respectively. In other words, areas AA, AB, AC are communicable areas between vehicle 10 and terminal 30 in the vehicle exterior. As shown in this figure, the communicable area between vehicle 10 and terminal 30 in the vehicle exterior is limited to a relatively narrow space having each door handle at the center, and an area in proximity to lid 110, for example, is not included in the communicable area.

Areas AD, AE, AF show the transmission areas of request signal R(1) from interior transmitters 126A, 126B and luggage room transmitter 126C, respectively. In other words, the areas shown by areas AD, AE, AF are the communicable areas between vehicle 10 and terminal 30 in the vehicle interior. As shown in this figure, the communicable area between vehicle 10 and terminal 30 in the vehicle interior covers almost the entire vehicle interior, so that response signal A(1) is transmitted from terminal 30 to vehicle 10 as long as the user carrying terminal 30 is in the vehicle interior.

Transmission area AR of request signal R(2) from transmitter 220 of power supply device 20 is limited to an area including lid 110 and not including the user's seat and the luggage room, in a state in which vehicle 10 is parked in the charging available location in proximity to power supply device 20. In other words, the communicable area between power supply device 20 and terminal 30 is limited to this transmission area AR, so that, for example, in a state in which the user carrying terminal 30 is in the vehicle interior, power supply device 20 cannot receive response signal A(2) from terminal 30.

Figure 5:
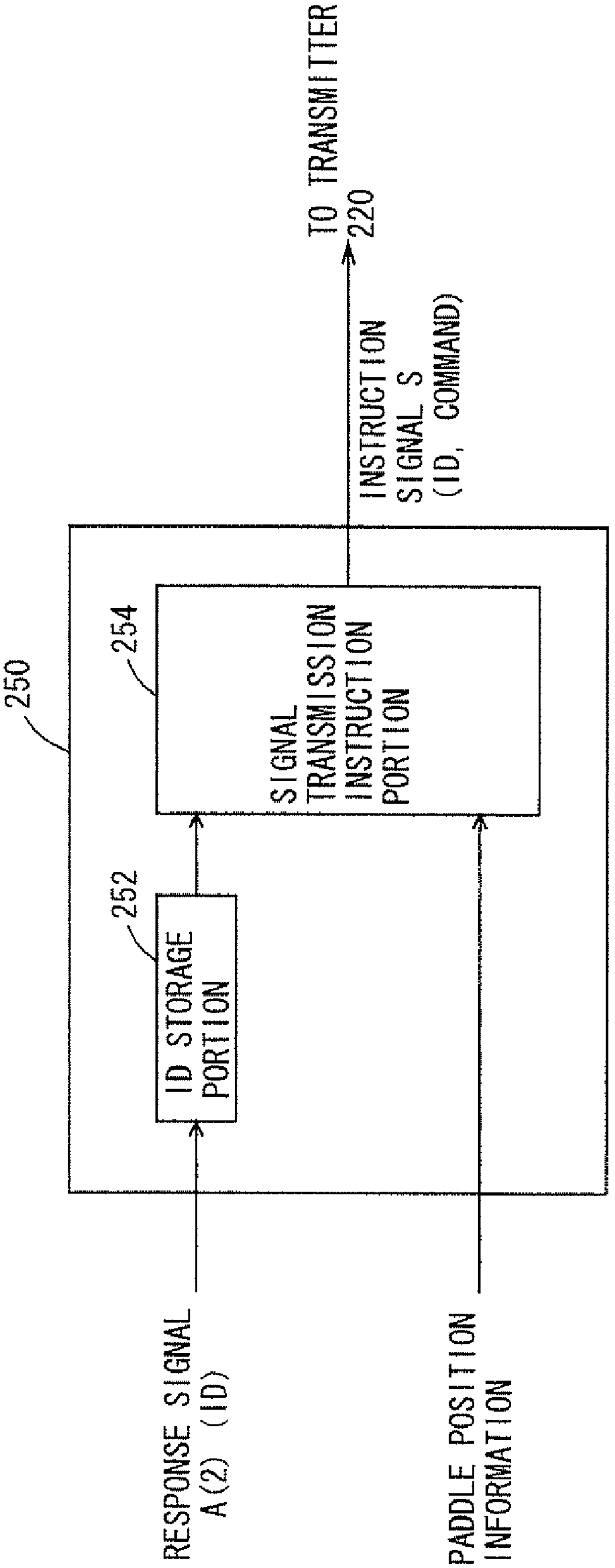
FIG. 5 is a functional block diagram of the power supply device in accordance with the first embodiment of the present invention.

Referring to FIG. 5, a functional block diagram of power supply device 20 included in the vehicle control system in accordance with the present embodiment will be described. As shown in FIG. 5, power supply device 20 includes an ID storage portion 252 and a signal transmission instruction portion 254.

ID storage portion 252 stores an ID code included in response signal A(2) from terminal 30 and outputs the same to signal transmission instruction portion 254.

Signal transmission instruction portion 254 outputs to transmitter 220 instruction signal S including an ID code from ID storage portion 252 and a command to request control of vehicle 10, based on a signal (paddle position information) from paddle position sensor 240. Accordingly, instruction signal S is transmitted from transmitter 220 to vehicle 10.

Figure 6:
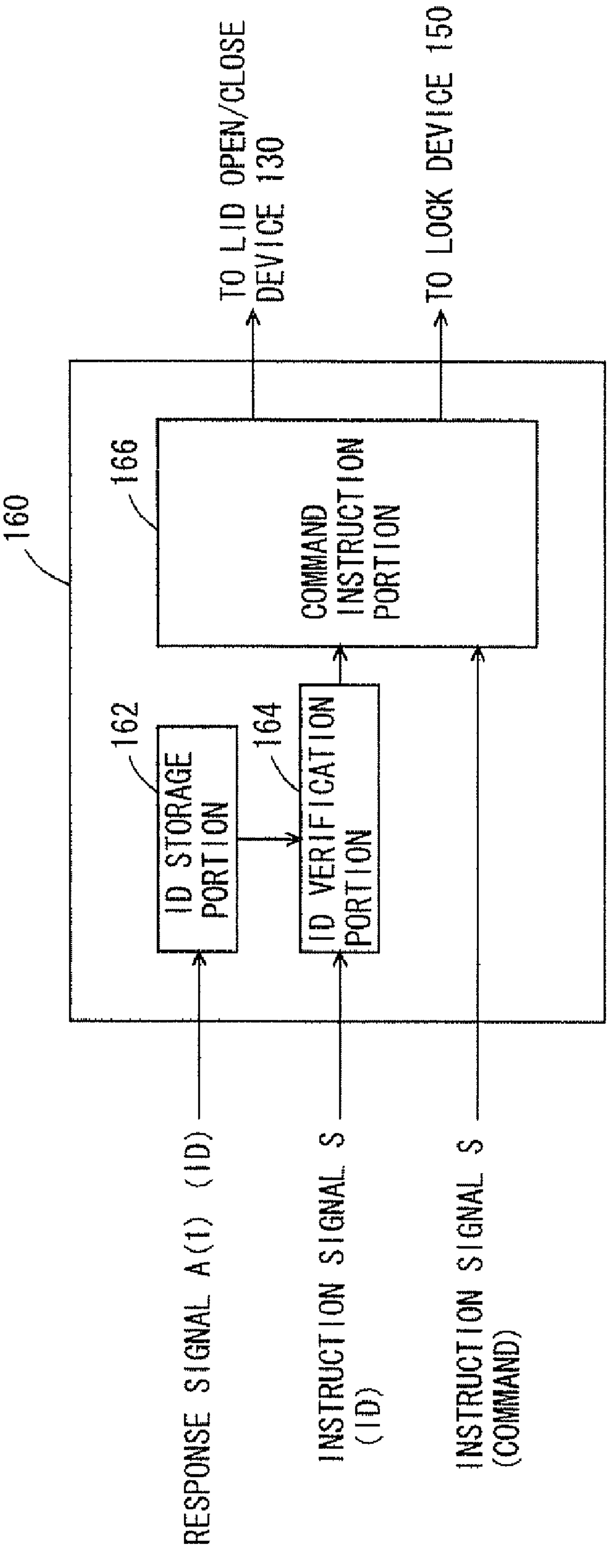
FIG. 6 is a functional block diagram of the vehicle in accordance with the first embodiment of the present invention.

Referring to FIG. 6, a functional block diagram of vehicle 10 included in the vehicle control system in accordance with the present embodiment will be described. As shown in FIG. 6, vehicle 10 includes an ID storage portion 162, an ID verification portion 164, and a command instruction portion 166.

ID storage portion 162 stores beforehand an ID code included in response signal A(1) from terminal 30.

ID verification portion 164 verifies whether or not the ID code stored in ID storage portion 162 matches the ID code included in instruction signal S from power supply device 20.

Command instruction portion 166 outputs a control signal to lid opening/closing device 130 and paddle lock device 150, based on the command included in instruction signal S, when it is verified by ID verification portion 164 that the ID code matches.

The control device having such a functional block in accordance with the present embodiment may be implemented by hardware mainly configured with digital circuitry or analog circuitry or by software mainly configured by a CPU (Central Processing Unit) included in ECU 160 or ECU 250 and a memory as well as a program read from the memory and executed by CPU. In general, implementation by hardware is advantageous in terms of operating speed, and implementation by software is advantageous in terms of design change. In the following, a description will be made to a case where the control device is implemented as software.

Figure 7:
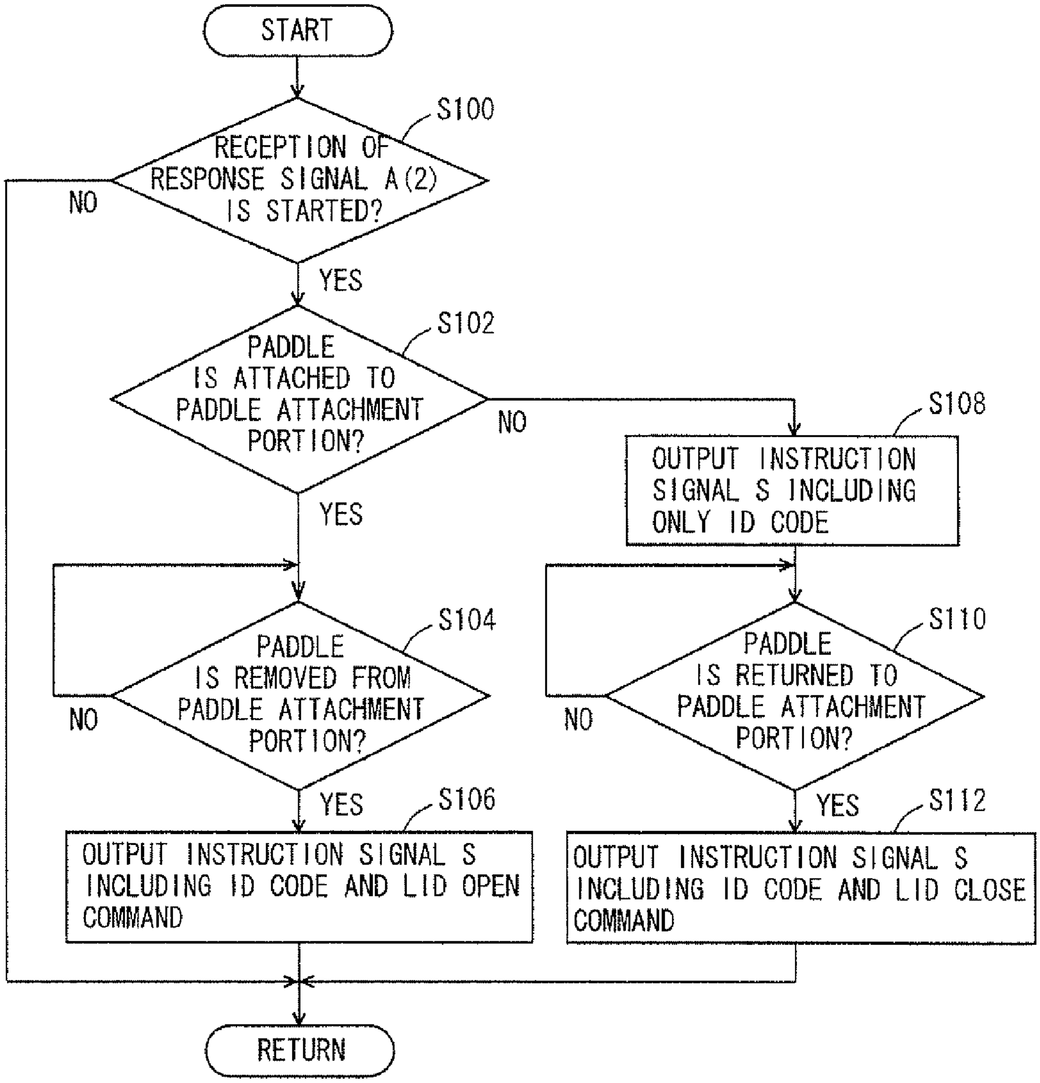
FIG. 7 is a flowchart showing a control structure of ECU included in the power supply device in accordance with the first embodiment of the present invention.

Referring to FIG. 7, a control structure of a program executed by ECU 250 will be described. It is noted that the program is repeatedly executed at a predetermine cycle time.

In step (hereinafter, step will be abbreviated as S) 100, ECU 250 determines whether or not reception of response signal A(2) transmitted from terminal 30 is started. If it is determined that it is started (YES in S100), the process proceeds to S102. Otherwise (NO in S100), this process ends.

In S102, ECU 250 determines whether or not charging paddle 22 is attached to paddle attachment portion 24, based on a signal from paddle position sensor 240. If it is determined that it is attached (YES in S102), the process proceeds to S104. Otherwise (NO in S102), the process proceeds to S108.

In S104, ECU 250 determines whether or not charging paddle 22 is removed from paddle attachment portion 24. If it is determined that it is removed (YES in S104), the process proceeds to S106. Otherwise (NO in S104), the process returns to S104.

In S106, ECU 250 outputs to transmitter 220 instruction signal S including an ID code included in response signal A(2) and a lid open command.

In S108, ECU 250 outputs to transmitter 220 instruction signal S including only the ID code included in response signal A(2).

In S110, ECU 250 determines whether or not charging paddle 22 is returned to paddle attachment portion 24. If it is determined that it is returned (YES in S110), the process proceeds to S112. Otherwise (NO in S110), the process returns to S110.

In S112, ECU 250 outputs to transmitter 220 instruction signal S including the ID code included in response signal A(2) and a lid close command.

Figure 8:
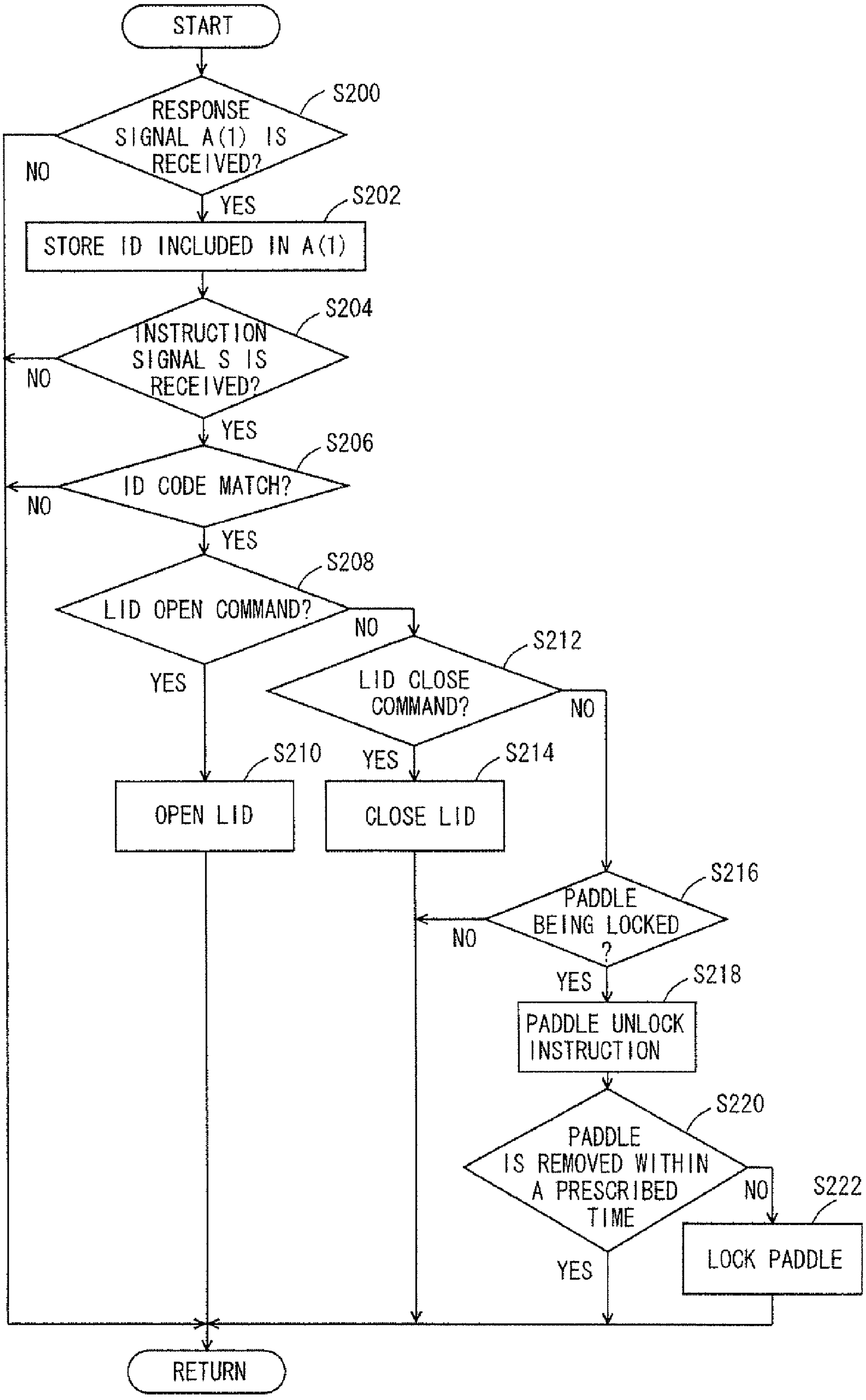
FIG. 8 is a flowchart showing a control structure of ECU included in the vehicle in accordance with the first embodiment of the present invention.

Referring to FIG. 8, a control structure of a program executed by ECU 160 will be described. It is noted that the program is repeatedly executed at a predetermined cycle time.

In S200, ECU 160 determines whether or not response signal A(1) from terminal 30 is received. If it is determined that it is received (YES in S200), the process proceeds to S202. Otherwise (NO in S200), the process ends.

In S202, ECU 160 stores the ID code included in response signal A(1). Here, the ID code may be registered beforehand in the vehicle or may be registered by the user when the user gets into the vehicle.

In S204, ECU 160 determines whether or not instruction signal S from power supply device 20 is received. If it is determined that it is received (YES in S204), the process proceeds to S206. Otherwise (NO in S204), the process ends.

In S206, ECU 160 determines whether or not the stored ID code (the ID code included in response signal A(1)) matches the ID code included in instruction signal S. If it matches (YES in S206), the process proceeds to S208. Otherwise (NO in S206), the process ends.

In S208, ECU 160 determines whether or not a lid open command is included in instruction signal S. If a lid open command is included (YES in S208), the process proceeds to S210. Otherwise (NO in S208), the process proceeds to S212.

In S210, ECU 160 outputs a control signal for opening lid 110 to lid opening/closing device 130.

In S212, ECU 160 determines whether or not a lid close command is included in instruction signal S. If a lid close command is included (YES in S212), the process proceeds to S214. Otherwise (NO in S212), the process proceeds to S216.

In S214, ECU 160 outputs a control signal for closing lid 110 to lid opening/closing device 130.

In S216, ECU 160 determines whether or not charging paddle 22 is being locked by paddle lock device 150. If charging paddle 22 is being locked (YES in S216), the process proceeds to S218. Otherwise (NO in S216), the process ends.

In S218, ECU 160 outputs a paddle unlock instruction (unlock instruction) to paddle lock device 150.

In S220, ECU 160 determines whether or not charging paddle 22 is removed from receptacle 12 within a prescribed period of time since the paddle unlock instruction is output, based on a signal from connection sensor 142. For example, ECU 160 determines that charging paddle 22 is removed from receptacle 12 when a state in which charging plug 140 and charging paddle 22 are connected with each other changes to a state in which they are not connected. If it is determined that charging paddle 22 is removed within a predetermined time (YES in S220), this process ends. Otherwise (NO in S220), the process proceeds to S222.

In S222, ECU 160 outputs a paddle lock instruction to paddle lock device 150.

An operation of lid 110 controlled by the vehicle control system in accordance with the present embodiment will be described based on the foregoing structure and flowchart.

[At Start of Charging]

It is assumed that the user of vehicle 10 who carries terminal 30 stops vehicle 10 in a parking lot in order to perform a charging operation. Immediately after parking, the user is in the driver's seat and response signal A(1) is transmitted from terminal 30 in response to request signal R(1) from interior transmitter 126A. Therefore, the ID code included in response signal A(1) is stored in vehicle 10 (YES in S200, S202).

Thereafter, for the purpose of starting a charging operation, the user gets out of vehicle 10 and approaches receptacle 12 and power supply device 20 to enter transmission area AR of request signal R(2) of power supply device 20. Then, in power supply device 20, reception of response signal A(2) including the ID code from terminal 30 is started (YES in S100). Therefore, even if the user does not register the ID code in power supply device 20 in advance, the ID code from terminal 30 is automatically received in power supply device 20.

When the user removes, from paddle attachment portion 24, charging paddle 22 attached to paddle attachment portion 24 (YES in S 102, YES in S104), instruction signal S including the ID code included in response signal A(2) and a lid open command is transmitted from power supply device 20 to vehicle 10 (S106).

If this instruction signal S is received by vehicle 10 (YES in S204), and if the ID code included in instruction signal S matches the stored ID code (YES in S206) and it is confirmed that the charging operator is the user of vehicle 10, lid 110 is opened based on the lid open command included in instruction signal S (YES in S208, S210), In this manner, the user only has to remove charging paddle 22 so that lid 110 is automatically opened. Therefore, even when the user goes outside the car without performing an operation of opening/closing lid 110 in the car, the user does not have to manually perform a lid opening operation with a key or an operation unit in the car or outside of the car. In addition, the user does not have to register the ID code beforehand in power supply device 20. Therefore, a charging starting operation can be simplified.

Moreover, since vehicle 10 receives an ID code via power supply device 20, in a case where the user does not have an intention of charging and power supply device 20 is not present close to vehicle 10, lid 110 is not opened even when the user approaches the vicinity of receptacle 12. Therefore, for example, as compared with a case where instruction signal S is directly received from terminal 30 to open/close lid 110, lid 110 can be opened/closed according to the user's intention of charging.

Furthermore, since lid 110 is opened/closed according to a verification result of an ID code, lid 110 of the user's vehicle is not opened even if any other person comes to the vicinity of power supply device 20 and operates charging paddle 22. On the other hand, the lid of any other vehicle is not opened by itself even if the user operates charging paddle 22. Therefore, even when a plurality of vehicles exist in proximity to power supply device 20, only the lid of the vehicle of the user having the intention of charging can be opened/closed.

[At End of Charging]

It is assumed that the user who left vehicle 10 during charging returns to the proximity of power supply device 20 in order to terminate a charging operation and get vehicle 10 started.

At this moment, when the user enters transmission area AR of request signal R(2) from power supply device 20, reception of response signal A(2) from terminal 30 is started in power supply device 20 (YES in S100). Here, charging paddle 22 is not attached to paddle attachment portion 24 because of charging (NO in S102), and therefore instruction signal S including only the ID code included in response signal A(2) is transmitted from power supply device 20 to vehicle 10 (S108).

If instruction signal S is received by vehicle 10 (YES in S204) and if the ID code included in instruction signal S matches the stored ID code (YES in S206), charging paddle 22 is unlocked (YES in S216, S218), because only the ID code is included in instruction signal S (NO in S208, NO in S212).

In this manner, the user only has to approach the proximity of power supply device 20 for the purpose of terminating the charging operation so that charging paddle 22 and vehicle 10 are unlocked from each other. Therefore, a manual unlocking operation by the user becomes unnecessary, thereby simplifying the charging terminating operation. When the user leaves vehicle 10 again without terminating the charging operation, charging paddle 22 is not removed from receptacle 12 within a prescribed period of time (NO in S220), and therefore charging paddle 22 and vehicle 10 are automatically locked with each other again (S222), thereby preventing any other person from using charging paddle 22.

When the user removes charging paddle 22 from receptacle 12 to return it to paddle attachment portion 24 after unlocking charging paddle 22 (YES in S110), instruction signal S including the ID code and a lid close command is transmitted from power supply device 20 to vehicle 10 (S112) so that lid 110 is automatically closed (YES in S212, S214). Accordingly, the charging terminating operation can be simplified, similarly to the charging starting operation, and lid 110 can be closed according to the user's intention to terminate charging.

In addition, since lid 110 is closed at a timing when the user returns charging paddle 22 to paddle attachment portion 24, it is unlikely that lid 110 and charging paddle 22 interfere with each other, thereby ensuring that lid 110 is closed.

As described above, according to the vehicle control system in accordance with the present embodiment, when the user enters a communication area (transmission area AR) between the power supply device and the terminal at a time of a vehicle charging operation, the power supply device receives the ID code from the terminal carried by the user and transmits a lid open command (or a lid close command) together with the ID code to the vehicle, based on the charging paddle operation by the user. When the ID code form the power supply device matches the stored ID code, the vehicle opens/closes the lid covering the power receptacle, based on the command from the power supply device. Therefore, even if the user does not register the ID code beforehand in the power supply device, or even if the user does not perform a manual operation, the user only has to operate the charging paddle for the purpose of charging so that the lid can automatically be opened/closed. As a result, the power receptacle of the vehicle can be opened/closed appropriately according to the user's intention of charging, with a simplified charging operation.

In the present embodiment, as shown in FIG. 4 above, transmission area AR of request signal R(2) from power supply device 20 is limited to the area that includes lid 110 and does not include the user's seat and the luggage room. Therefore, instruction signal S may be transmitted to vehicle 10 at the instant when the user enters transmission area AR (that is, when power supply device 20 receives response signal A(2) from terminal 30), without determination of an operation state of charging paddle 22 (S104 in FIG. 7, S110). Also in this manner, although the lid is not opened/closed at the instant when the user is in the car, the lid can be opened/closed at the instant when the user thereafter goes outside the car and enters transmission area AR. By contrast, in the present embodiment, as mentioned in the foregoing description of FIG. 7, instruction signal S (lid open/close command) is transmitted on the condition that charging paddle 22 is operated (YES in S104, YES in S110 in FIG. 7). Therefore, transmission area AR of request signal R(2) from power supply device 20 may be enlarged to a broader range or may be restricted to a narrower range in proximity to paddle attachment portion 24. Also in this manner, the lid can be opened/closed at the instant when the user operates charging paddle 22.

Although in this embodiment power supply device 20 transmits instruction signal S only including an ID code to vehicle 10 in S108 in FIG. 7, power supply device 20 may transmit instruction signal S including an ID code and an unlock command so that charging paddle 22 and vehicle 10 are unlocked from each other when instruction signal S including the unlock command is received at vehicle 10.

Furthermore, although in the present embodiment the vehicle control system in accordance with the present invention is applied to a vehicle having a motor driven by electric power as a driving source, a vehicle to which the vehicle control system in accordance with the present invention is applicable is not limited thereto. For example, the vehicle control system in accordance with the present invention may be applied to a vehicle having an engine as a driving source, and the opening/closing of a fuel port into which a fuel supply nozzle is inserted may be controlled automatically.

Modification of First Embodiment

Figure 9:
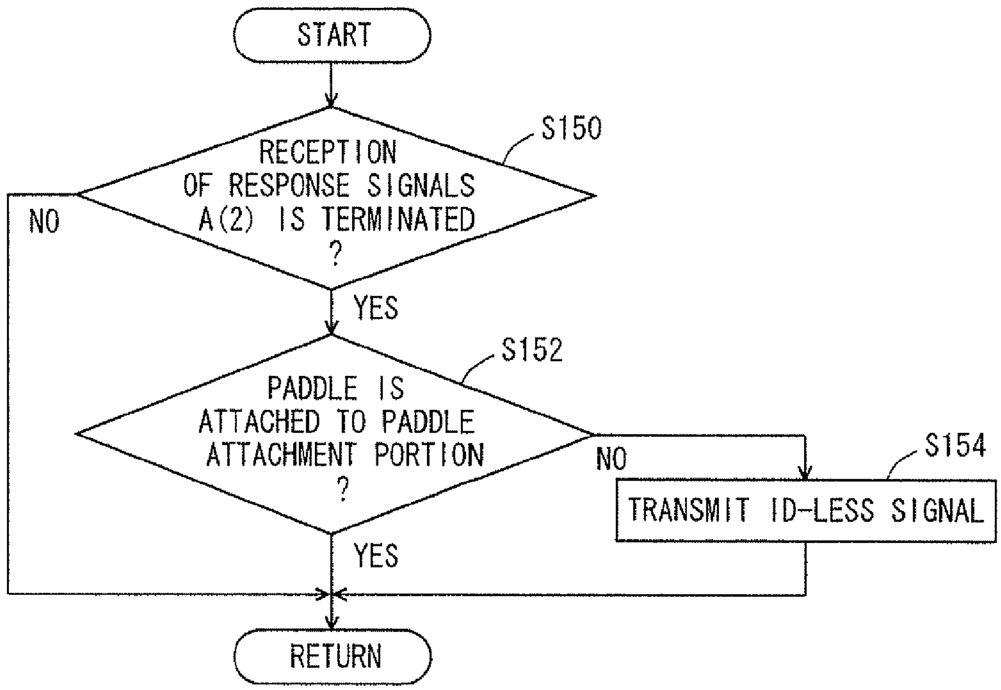
FIG. 9 is a flowchart showing a control structure of ECU included in the power supply device in accordance with a modification of the first embodiment of the present invention.
Figure 10:
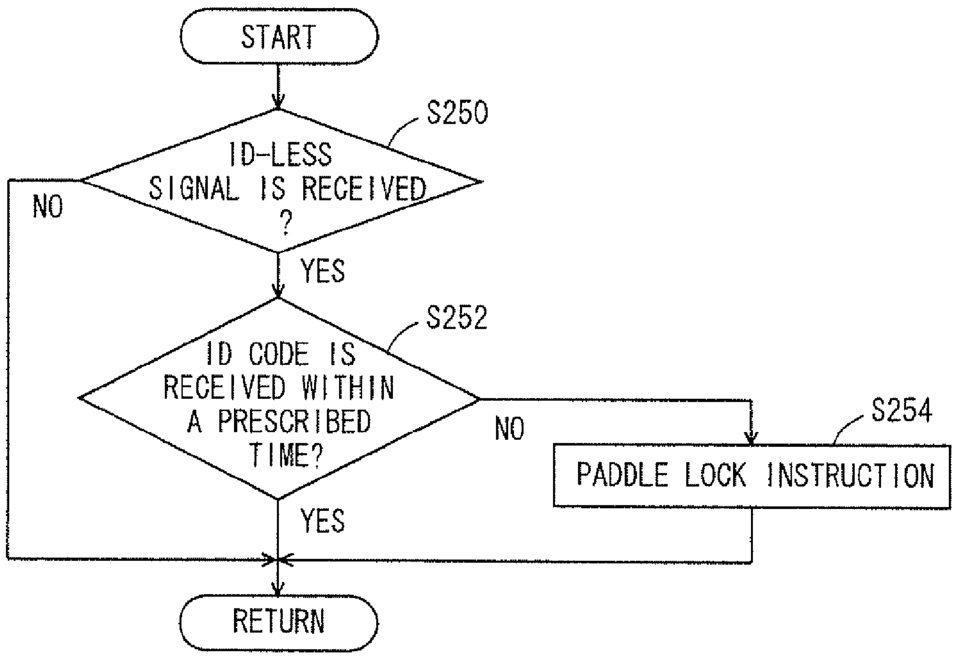
FIG. 10 is a flowchart showing a control structure of ECU included in the vehicle in accordance with the modification of the first embodiment of the present invention.

The following control structure shown in FIG. 9 and FIG. 10 may be added to the control structure of vehicle 10 and power supply device 20 in the foregoing vehicle control system in accordance with the first embodiment.

Referring to FIG. 9, a control structure of a program executed by ECU 250 in power supply device 20 in accordance with the present modification will be described. It is noted that this program is repeatedly executed at a predetermined cycle time.

In S150, ECU 250 determines whether or not reception of response signal A(2) from terminal 30 ends. If reception of response signal A(2) ends (YES in S150), the process proceeds to S152. Otherwise (NO in S150), the process ends.

In S152, ECU 250 determines whether or not charging paddle 22 is attached to paddle attachment portion 24, based on a signal from paddle position sensor 240. If it is determined that it is attached (YES in S152), the process ends. Otherwise (NO in S152), the process proceeds to S154. In S154, ECU 250 transmits an ID-less signal to vehicle 10.

Referring to FIG. 10, a control structure of a program executed by ECU 160 in vehicle 10 in accordance with the present modification will be described. It is noted that this program is repeatedly executed at a predetermined cycle time.

In S250, ECU 160 determines whether or not an ID-less signal from power supply device 20 is received. If an ID-less signal is received (YES in S250), the process proceeds to S252. Otherwise (NO in S250), the process ends.

In S252, ECU 160 determines whether or not an ID code is received within a prescribed period of time since the ID-less signal is received. It is noted that this ID code may be included in response signal A(1) from terminal 30 or may be included in instruction signal S from power supply device 20. If an ID code is received within a prescribed period of time (YES in S252), the process ends. Otherwise (NO in S252), the process proceeds to S254.

In S254, ECU 160 outputs an instruction to lock charging paddle 22 and vehicle 10 with each other to paddle lock device 150. Accordingly, paddle lock device 150 is operated so that charging paddle 22 is locked while being inserted in receptacle 12.

In this manner, when the user leaves vehicle 10 during charging of vehicle 10 (YES in S150), charging paddle 22 is being inserted in receptacle 12 (NO in S152), and therefore, an ID-less signal is transmitted from power supply device 20 to vehicle 10 (S154). When a prescribed time has passed since vehicle 10 received the ID-less signal (YES in S250, NO in S252), charging paddle 22 is locked (S254). Accordingly, when the user leaves vehicle 10 during charging, charging paddle 22 is automatically locked, thereby preventing any other person from using charging paddle 22 without permission.

Second Embodiment

A vehicle control system in accordance with the present embodiment will be described below. The vehicle control system in accordance with the present embodiment differs from the configuration of the foregoing vehicle control system in accordance with the first embodiment in that a vehicle 1010 is included in place of vehicle 10. Except for this, the configuration is the same as the configuration of the foregoing vehicle control system in accordance with the first embodiment. The same components are denoted with the same reference characters. The functions thereof are also the same. Therefore, a detailed description thereof will not be repeated here.

Figure 11:
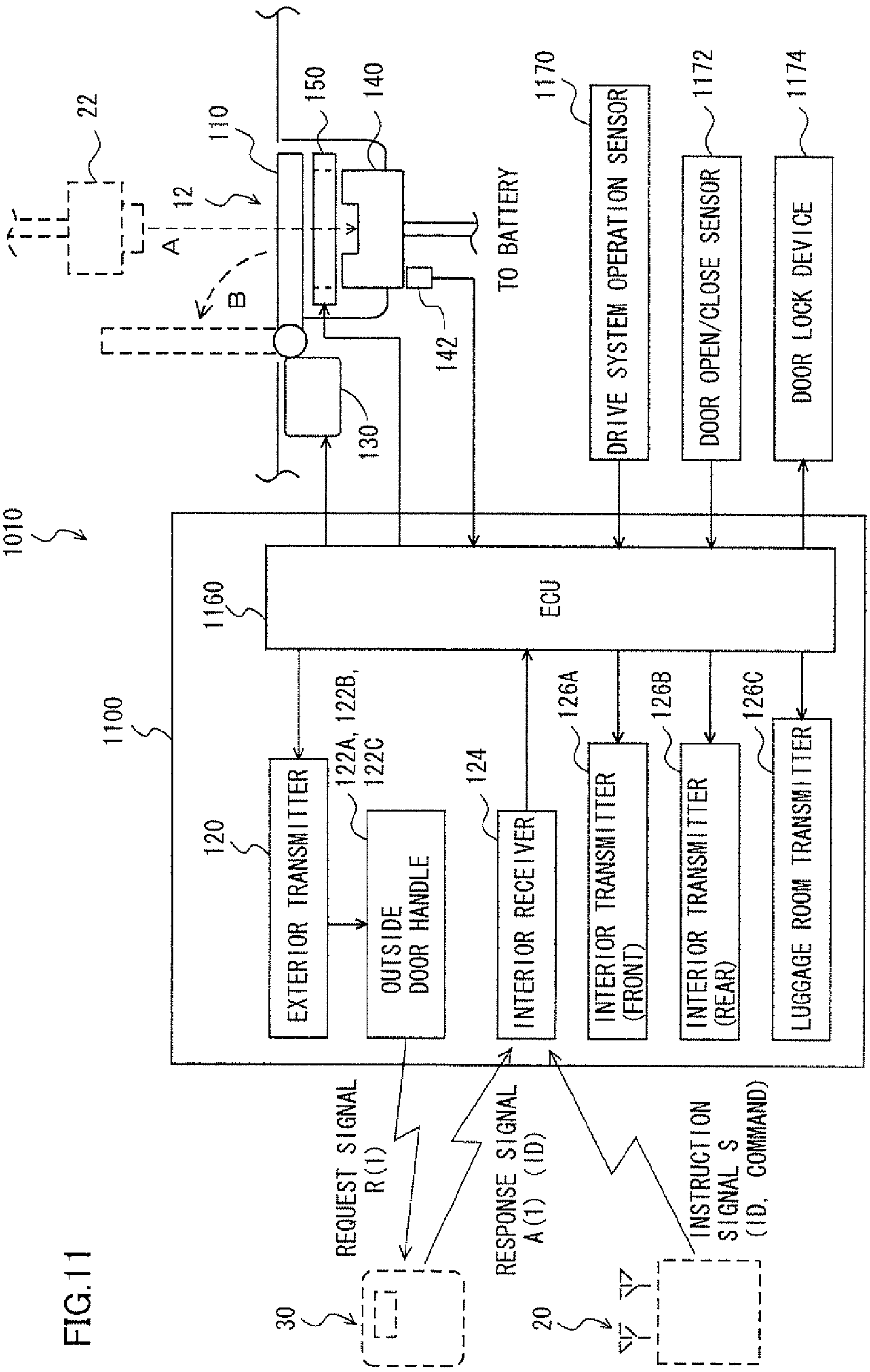
FIG. 11 is a diagram showing a configuration of the vehicle control system in accordance with a second embodiment of the present invention.

Referring to FIG. 11, vehicle 1010 included in the vehicle control system in accordance with the present embodiment will be described. Vehicle 1010 differs from vehicle 10 in accordance with the foregoing first embodiment in that a vehicle control portion 1100 is included in place of vehicle control portion 100 and in that a drive system operation sensor 1170, a door open/close sensor 1172, and a door lock device 1174 are further included. Vehicle control portion 1100 differs from vehicle control portion 100 in that an ECU 1160 is included in place of ECU 160. ECU 1160 differs from ECU 160 only in a control structure of a program to be executed. Except for this, the configuration is the same as the configuration of vehicle 10 in accordance with the foregoing first embodiment. The same components are denoted with the same reference characters. The functions thereof are also the same. Therefore, a detailed description thereof will not be repeated here.

Drive system operation sensor 1170 detects whether the drive system of vehicle 1010 is operated or not and transmits a signal indicating a detection result to ECU 1160.

Door open/close sensor 1172 detects open/closed states of each of the front doors, the rear doors, the luggage door, etc. of vehicle 1010 and transmits a signal indicating a detection result to ECU 1160.

Door lock device 1174 is a device that locks or unlocks each door in a state in which each door is closed, according to an instruction from ECU 1160.

ECU 1160 includes a control structure of a program described below in FIG. 12, in addition to the control structure of the program executed in ECU 160 in accordance with the foregoing first embodiment. ECU 1160 may not necessarily include the control structure of the program executed in ECU 160 but may include only the control structure of the program described below in FIG. 12.

Figure 12:
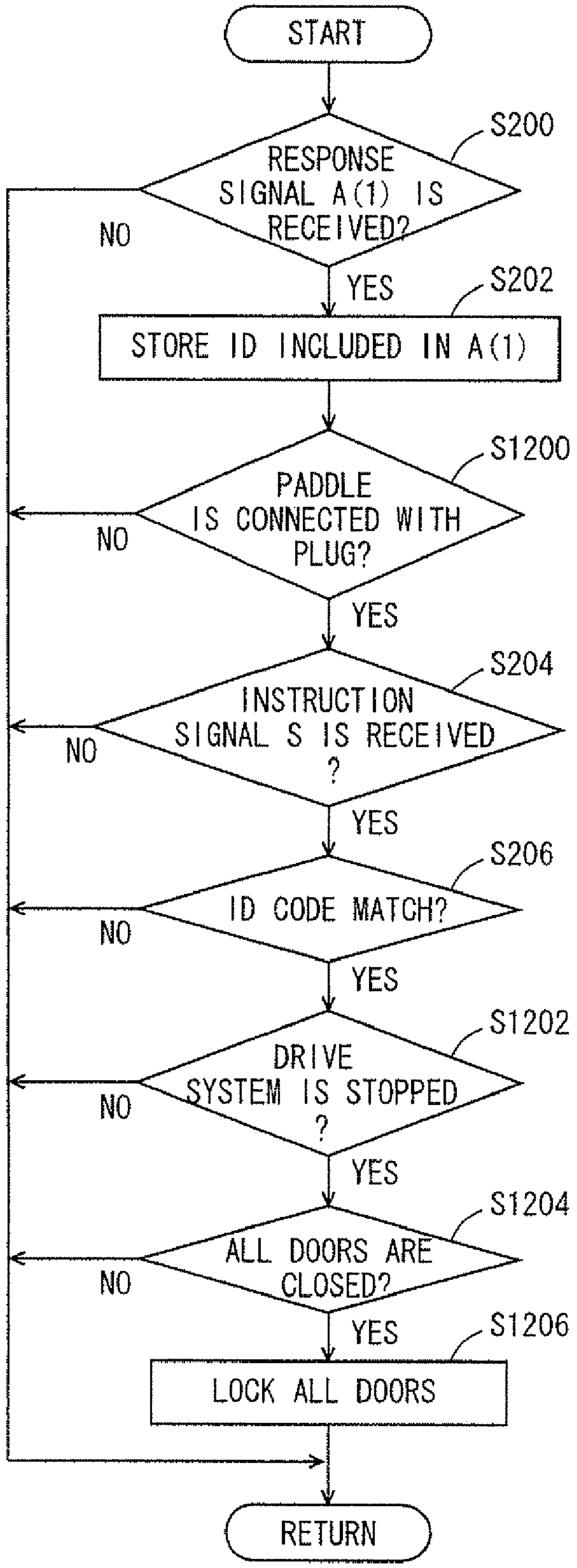
FIG. 12 is a flowchart showing a control structure of ECU included in the vehicle in accordance with the second embodiment of the present invention.

Referring to FIG. 12, the control structure of the program executed by ECU 1160 will be described. This program is repeatedly executed at a predetermined cycle time. It is noted that in the flowchart shown in FIG. 12, the same processes as those in the flowchart shown in FIG. 8 as described above are denoted with the same step numbers. The processes thereof are also the same. Therefore, a detailed description thereof will not be repeated here.

In S1200, ECU 1160 determines whether or not charging plug 140 is connected with charging paddle 22, based on a signal from connection sensor 142. If connected (YES in S1200), the process proceeds to S204. Otherwise (NO in S1200), the process ends.

In S1202, ECU 1160 determines whether or not the drive system of vehicle 1010 is stopped, based on a signal from drive system operation sensor 1170. If stopped (YES in S1202), the process proceeds to S1204. Otherwise (NO in S1202), the process ends.

In S1204, ECU 1160 determines whether or not all the doors of vehicle 1010 are closed, based on a signal from door open/close sensor 1172. If all the doors are closed (YES in S1204), the process proceeds to S1206. Otherwise (NO in S1204), the process ends.

In S1206, ECU 1160 transmits an instruction to lock all the doors to door lock device 1174.

The operation of each door of vehicle 1010 in accordance with the present embodiment will be described based on the structure and flowchart as described above.

It is assumed that the user of vehicle 1010 who carries terminal 30 stops vehicle 1010 in a parking lot and stops the drive system in order to perform a charging operation. The user is in the driver's seat immediately after parking, and response signal A(1) is transmitted from terminal 30 in response to request signal R(1) from interior transmitter 126A. Therefore, an ID code included in response signal A(1) is stored in vehicle 10 (YES in S200, S202).

Here, since charging requires some time, the user often waits at a place at a distance from vehicle 1010 (for example, at home) until charging is completed. Therefore, at the start of charging operation, the user often leaves vehicle 1010 after getting the things done in the interior of the vehicle and thereafter getting out of vehicle 1010, closing all the doors, and connecting charging paddle 22 to charging plug 140.

Then, when the user connects charging paddle 22 to charging plug 140 (YES in S1200), if the ID code included in instruction signal S from power supply device 20 matches the stored ID code (YES in S206), and if the drive system is stopped (YES in S1202) and all the doors are closed (YES in S1204), then all the doors are locked (S1206).

In this manner, the user only has to start a charging operation so that all the doors are automatically locked. Therefore, the user does not have to manually perform a door lock operation with a key or an operation unit. Furthermore, the user does not have to register the ID code beforehand in power supply device 20. This simplifies the door lock operation when the user leaves vehicle 1010 after starting the charging operation.

In addition, since vehicle 1010 receives an ID code via power supply device 20, there is no need for newly providing an antenna receiving an ID code from terminal 30 in the vicinity of lid 110. Moreover, since the ID code verification is performed not in power supply device 20 but in vehicle 1010, the user of the vehicle can use the present system without storing the ID code of his/her car beforehand in power supply device 20.

As described above, according to the vehicle control system in accordance with the present embodiment, once the user gets out of the vehicle and connects the charging paddle to the charging plug to start a charging operation, all the doors are automatically locked on the condition that the drive system is stopped and all the doors are closed. Accordingly, a manual door lock operation by the user becomes unnecessary when the user leaves the vehicle after starting the charging operation, thereby simplifying a door lock operation.

It is noted that, in the present embodiment, an input button for the user to input a request for door lock may be provided separately at charging paddle 22, and the user operates this input button with charging paddle 22 being connected to charging plug 140, which triggers ECU 1160 to execute door lock. Because of such a configuration, the door lock operation at a time of charging can be selected as desired by the user, thereby further improving convenience.

First Modification of Second Embodiment

The door lock condition in accordance with the foregoing second embodiment may be modified in this modification as follows. Specifically, in this modification, an antenna for the lid for receiving an ID code from terminal 30 is newly provided in the vicinity of lid 110 of vehicle 1010, and a program having a control structure shown in FIG. 13 may be executed by ECU 1160 in place of the foregoing one in FIG. 12.

Figure 13:
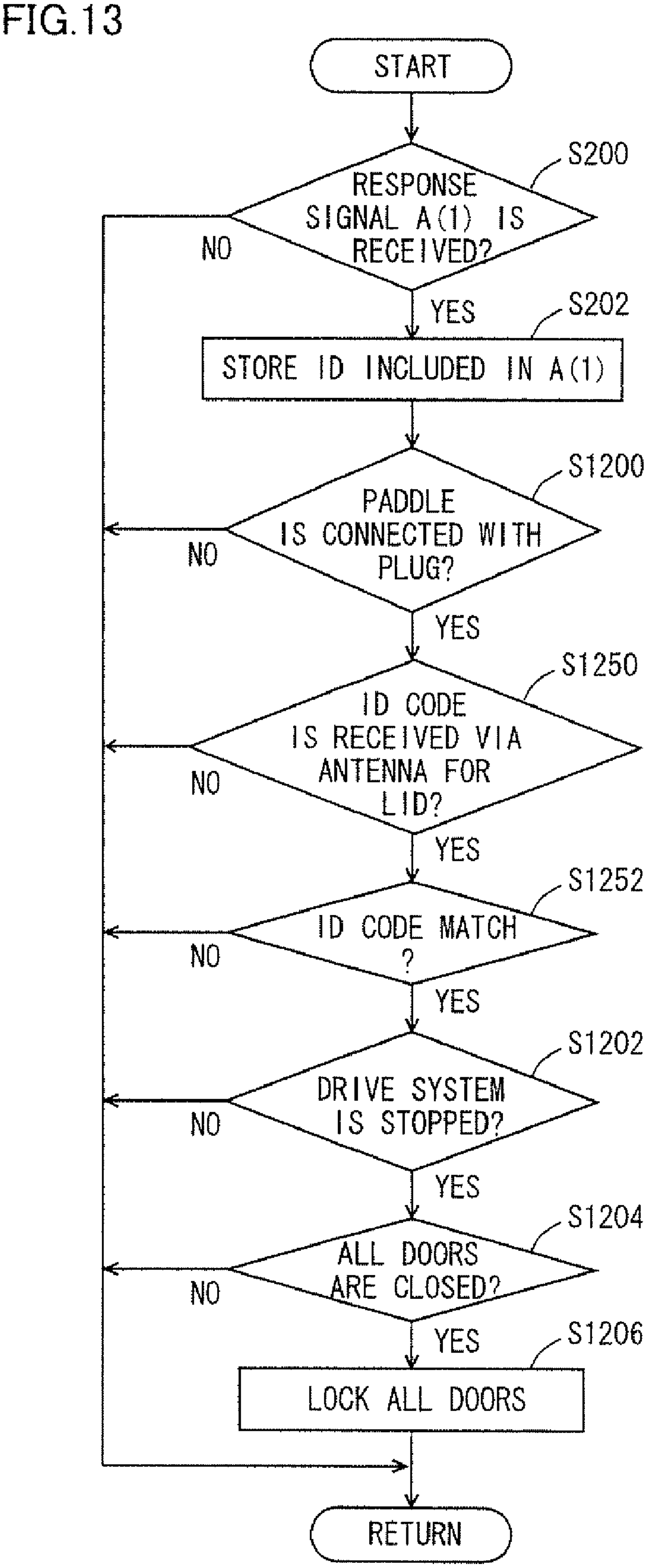
FIG. 13 is a flowchart showing a control structure of ECU included in the vehicle in accordance with a (first) modification of the second embodiment of the present invention.

Referring to FIG. 13, the control structure of the program executed by ECU 1160 in accordance with the present modification will be described. In the flowchart shown in FIG. 13, the same processes as those in the flowchart shown in FIG. 12 described above are denoted with the same step numbers. The processes thereof are also the same. Therefore, a detailed description thereof will not be repeated here.

In S1250, ECU 1160 determines whether or not an ID code is received via the antenna for the lid. If it is determined that it is received (YES in S1250), the process proceeds to S1252. Otherwise (NO in S1250), the process ends.

In S1252, ECU 1160 determines whether or not the ID code received via the antenna for the lid matches the stored ID code (the ID code included in response signal A(1)). If it matches (YES in S1252), the process proceeds to S1202. Otherwise (NO in S1252), the process ends.

In this manner, although an antenna for the lid needs to be newly provided, all the doors are automatically locked without communication with power supply device 20, thereby simplifying the door lock operation.

Second Modification of Second Embodiment

The door lock condition in accordance with the foregoing second embodiment may be modified in this modification as follows. Specifically, in this modification, ECU 1160 may execute a program having a control structure shown in FIG. 14 in place of the foregoing one in FIG. 12.

Figure 14:
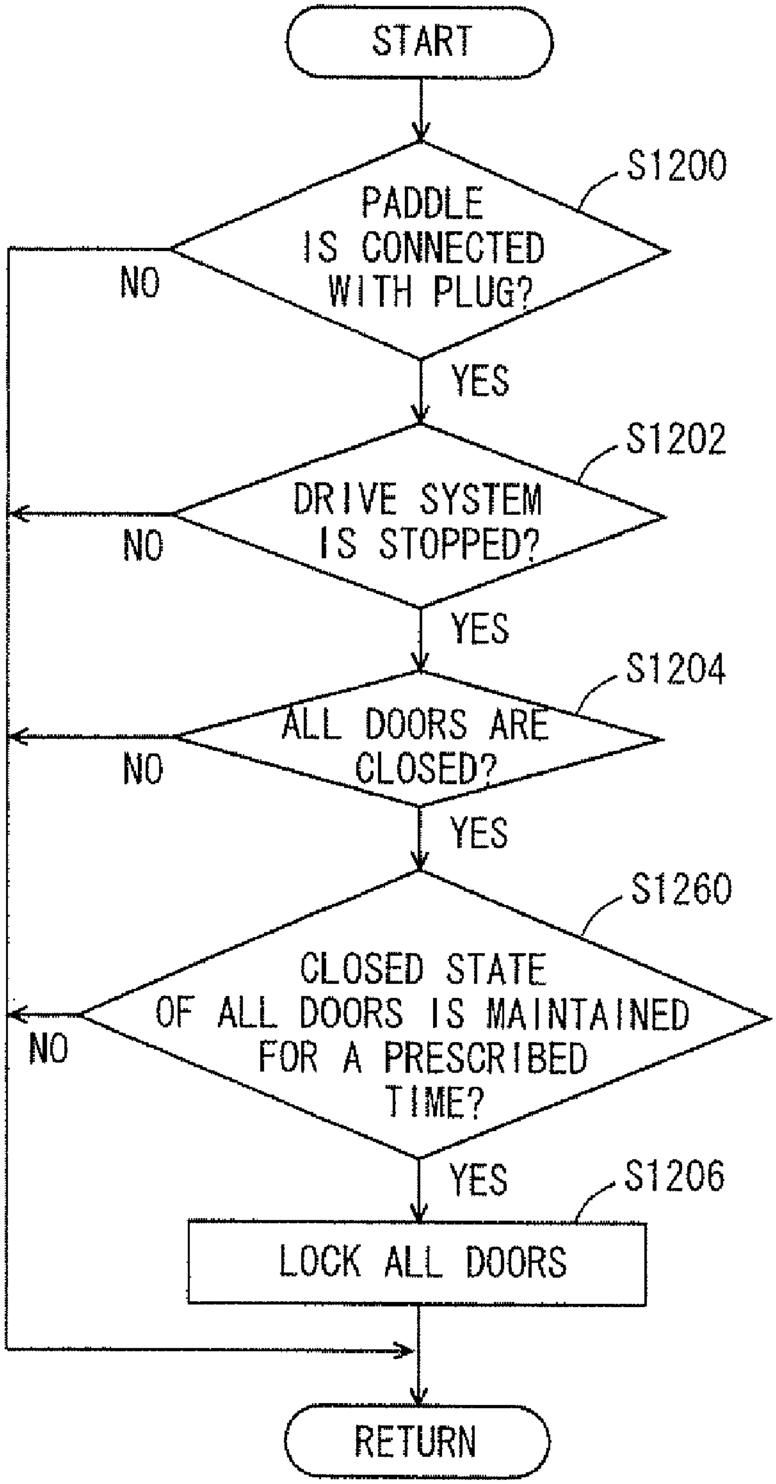
FIG. 14 is a flowchart showing a control structure of ECU included in the vehicle in accordance with a (second) modification of the second embodiment of the present invention.

Referring to FIG. 14, the control structure of the program executed by ECU 1160 in accordance with the present modification will be described. In the flowchart shown in FIG. 14, the same processes as those in the flowchart shown in FIG. 12 described above are denoted with the same step numbers. The processes thereof are also the same. Therefore, a detailed description thereof will not be repeated here.

In S1260, ECU 1160 determines whether or not a state in which all the doors are closed is maintained for a prescribed time. If a state in which all the doors are closed is maintained for a prescribed time (YES in S1260), the process proceeds to S1206. Otherwise (NO in S1260), the process ends.

In this manner, although it cannot be confirmed by the ID code that the charging operator is the user of vehicle 10, all the doors are automatically locked without newly providing an antenna for the lid and without communication with power supply device 20, thereby simplifying the door lock operation.

Although the description has been made to a case where the doors are locked if the ID code matches and if charging paddle 22 is connected with charging plug 140 of vehicle 10 in the second embodiment, all the doors may be unlocked if the ID code matches when the user approaches the vicinity of receptacle 12 for the purpose of getting into vehicle 1010 and if charging paddle 22 is thereafter removed from charging plug 140 of vehicle 1010.

It should be understood that the embodiments disclosed here are illustrative rather than limitative. The scope of the present invention are shown not in the foregoing description but in the claims, and it is intended that equivalents to the claims and all modification within the claims are embraced herein.

The invention claimed is:

1. A control device of a vehicle including an energy receptacle for receiving energy supply from a supply device and at least one door opened and closed by a user, said supply device being provided with a connector connected to said energy receptacle at a time of energy supply to said vehicle, said control device comprising:

a sensor for detecting whether or not said connector is connected with said energy receptacle;

a door lock device for locking said door; and a control unit connected to said door lock device, wherein said control unit controls said door lock device such that said door is locked when a prescribed condition is satisfied, and said prescribed condition includes a condition that said sensor detects that said connector is connected with said energy receptacle.

2. The control device of the vehicle according to claim 1, wherein said prescribed condition further includes at least any one of a condition that said door is in a closed state, a condition that a state in which said door is closed is maintained for a prescribed time, and a condition that a drive system for driving said vehicle is stopped.

3. The control device of the vehicle according to claim 1, wherein said supply device receives unique information of said vehicle as transmitted from a terminal that is portable by said user and transmits said unique information to said control device, said control device further includes a receiver connected to said control unit to receive said unique information transmitted from said supply device, and said prescribed condition further includes a matching condition that said unique information received by said receiver matches unique information stored beforehand in said control unit.

4. The control device of the vehicle according to claim 3, wherein said control device further includes an opening/closing device connected to said control unit for opening and closing a cap portion covering said energy receptacle, and said control unit controls said opening/closing device when said matching condition is satisfied.

5. The control device of the vehicle according to claim 4, wherein said supply device transmits a request signal to a predetermined range, and said terminal transmits said unique information to said supply device when receiving said request signal from said supply device, and said predetermined range is set in a range that includes said energy receptacle and does not include a seat of said vehicle, in a state in which said vehicle is present at a location where energy supply from said supply device to said vehicle is available.

6. The control device of the vehicle according to claim 3, wherein said control device further includes a connector lock device connected to said control unit for locking connection between said connector and said energy receptacle, and said control unit controls said connector lock device when said matching condition is satisfied.

7. The control device of the vehicle according to claim 6, wherein said supply device transmits a request signal to a predetermined range, and said terminal transmits said unique information to said supply device when receiving said request signal from said supply device, and said predetermined range is set in a range that includes said energy receptacle and does not include a seat of said vehicle, in a state in which said vehicle is present at a location where energy supply from said supply device to said vehicle is available.

8. The control device of the vehicle according to claim 1, wherein said vehicle receives unique information of said vehicle as transmitted from a terminal that is portable by said user, by a receiver provided in a vicinity of said energy receptacle, and said prescribed condition further includes a matching condition that said unique information received by said receiver provided in a vicinity of said energy receptacle matches unique information stored beforehand in said control unit.

9. The control device of the vehicle according to claim 1, wherein said connector is provided with an input portion for said user to input a lock request indicating that locking of said door is requested, and said prescribed condition further includes a condition that said lock request is input.

10. A control method performed by a control unit controlling a vehicle including an energy receptacle receiving energy supply from a supply device and at least one door opened and closed by a user, said supply device being provided with a connector connected to said energy receptacle at a time of energy supply to said vehicle, wherein said control unit is connected with a door lock device for locking said door and a sensor for detecting whether or not said connector is connected with said energy receptacle, said control method comprising the steps of:

determining whether or not said sensor detects that said connector is connected with said energy receptacle; and controlling said door lock device such that said door is locked when a prescribed condition including a condition that said sensor detects that said connector is connected with said energy receptacle is satisfied.

* * * * *